(12) United States Patent
Bellamy

(10) Patent No.: US 11,625,808 B2
(45) Date of Patent: *Apr. 11, 2023

(54) GRAPHICS PROCESSING SYSTEMS

(71) Applicant: Arm Limited, Cambridge (GB)

(72) Inventor: Mark Stephen Bellamy, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,703

(22) Filed: Sep. 8, 2021

(65) Prior Publication Data
US 2022/0036499 A1 Feb. 3, 2022

Related U.S. Application Data

(63) Continuation-in-part of application No. 16/943,478, filed on Jul. 30, 2020, now Pat. No. 11,398,005.

(51) Int. Cl.
G09G 5/393 (2006.01)
G06T 1/20 (2006.01)
G06T 1/00 (2006.01)
G09G 5/36 (2006.01)
G06T 7/10 (2017.01)

(52) U.S. Cl.
CPC .............. *G06T 1/20* (2013.01); *G06T 1/0007* (2013.01); *G06T 7/10* (2017.01); *G09G 5/363* (2013.01); *G09G 2340/16* (2013.01); *G09G 2360/12* (2013.01)

(58) Field of Classification Search
CPC ............ G09G 5/393; G09G 2360/122; G09G 2320/103; G09G 2310/04; G09G 5/395; G09G 5/397; G06T 15/005; G06T 1/20; G06T 7/248; G06F 3/1415
See application file for complete search history.

(56) References Cited

U.S. PATENT DOCUMENTS

| 8,988,443 | B2 | 3/2015 | Croxford |
| 9,182,934 | B2 | 11/2015 | Croxford |
| 9,195,426 | B2 | 11/2015 | Croxford |

(Continued)

FOREIGN PATENT DOCUMENTS

EP 3663918 6/2020

OTHER PUBLICATIONS

Office Action dated Jul. 19, 2021, U.S. Appl. No. 16/943,478.
(Continued)

*Primary Examiner* — Hau H Nguyen
(74) *Attorney, Agent, or Firm* — Vierra Magen Marcus LLP

(57) ABSTRACT

When rendering a frame, e.g. that is to be used for rendering subsequent frames to be rendered, two versions of the frame are rendered, wherein the first version of the frame is rendered in its entirety but only a portion of the second version of the frame is rendered. The rendered portion of the second version of the frame is compared to a corresponding rendered portion of the first version of the frame. When the comparison determines that the two portions of the two versions match, the frame is, e.g. used for rendering subsequent frames, but when the comparison determines the two portions of the two versions do not match, an error operation is performed.

20 Claims, 10 Drawing Sheets

(56) References Cited

U.S. PATENT DOCUMENTS

| | | |
|---|---|---|
| 9,406,155 B2 | 8/2016 | Oterhals |
| 9,640,131 B2 | 5/2017 | Croxford |
| 9,881,401 B2 | 1/2018 | Oterhals |
| 9,996,363 B2 | 6/2018 | Cooksey |
| 10,832,639 B2 | 11/2020 | Brkic |
| 2008/0002894 A1 | 1/2008 | Hayon et al. |
| 2011/0074800 A1 | 3/2011 | Stevens |
| 2014/0085324 A1 | 3/2014 | Charvet et al. |
| 2018/0308522 A1 | 10/2018 | Ramey |
| 2019/0033961 A1* | 1/2019 | Croxford ............ G06T 1/20 |
| 2019/0197651 A1 | 6/2019 | Johnson et al. |
| 2020/0073581 A1 | 3/2020 | Croxford |
| 2020/0380758 A1 | 12/2020 | Novales et al. |
| 2021/0109813 A1 | 4/2021 | Morris et al. |

OTHER PUBLICATIONS

Response to Office Action dated Nov. 19, 2021, U.S. Appl. No. 16/943,478.
Combined Search and Examination Report dated Aug. 1, 2022, GB Patent Application No. GB2117171.5.
Notice of Allowance dated Feb. 7, 2022, U.S. Appl. No. 16/943,478.
Corrected Notice of Allowability dated Feb. 22, 2022, U.S. Appl. No. 16/943,478.

\* cited by examiner

GRAPHICS PROCESSING SYSTEMS

BACKGROUND

The technology described herein relates to graphics processing systems, and in particular to the operation of graphics processing systems when being used in environments where the operation of the graphics processing system is required to be "functionally safe", such as may be the case for graphics processing systems being used for a human machine interface (HMI), such as in automotive or medical environments.

It is becoming increasingly common for graphics processors and graphics processing systems to be used to generate images for display in environments where it is important, e.g. for safety reasons, that the image(s) rendered by the graphics processor are correct.

For example, a graphics processor and graphics processing system may be used to render images for displaying to a driver of a vehicle, for example for a cockpit display, or as a mirror replacement system. In such situations, any errors in the images rendered by the graphics processor can have safety implications for the driver of the vehicle and/or for other people in or in proximity to the vehicle, and so it is important that the images rendered by the graphics processor are correct.

The Applicants believe that there remains scope for improvements to the operation of graphics processors and graphics processing systems, for example when being used for such safety-critical applications.

BRIEF DESCRIPTION OF THE DRAWINGS

Embodiments of the technology described herein will now be described, by way of example only, and with reference to the accompanying drawings, in which.

Like reference numerals are used for like features throughout the drawings, where appropriate.

DETAILED DESCRIPTION

Figure 1:
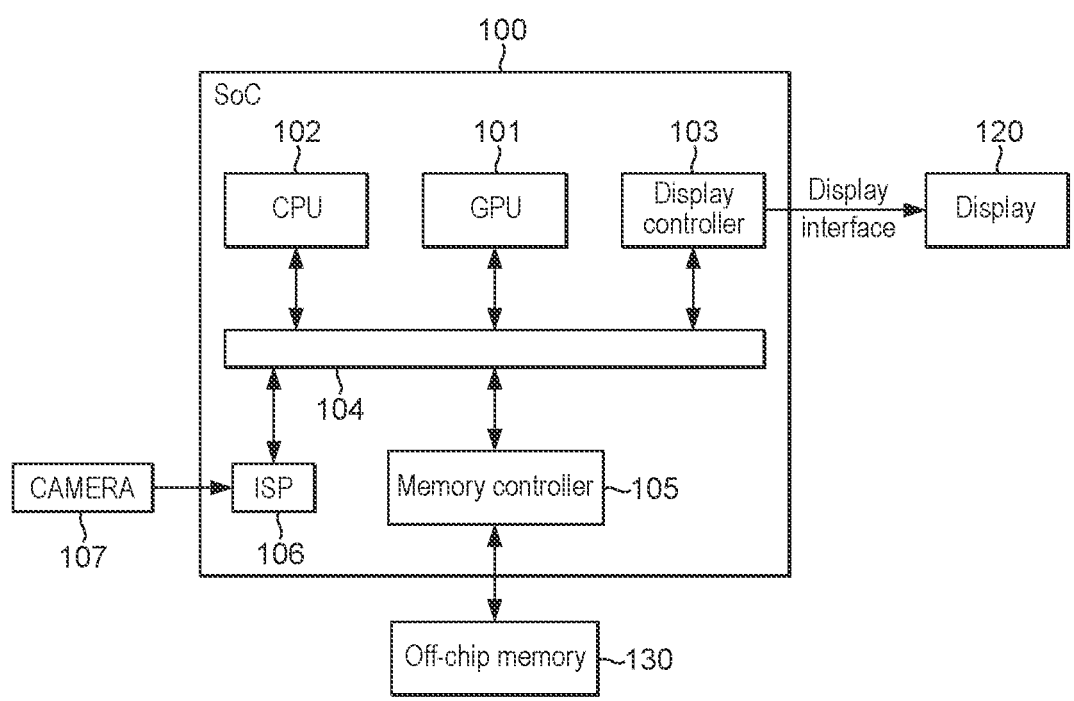
FIG. 1 shows an embodiment of a graphics processing system.

A first embodiment of the technology described herein comprises a method of operating a graphics processing system that includes a graphics processor operable to render frames, the method comprising:

when rendering a frame that is to be used for rendering subsequent frames to be rendered the graphics processor:
  rendering a first version of the frame that is to be used for rendering subsequent frames to be rendered;
  generating a set of information representative of the content of the first version of the frame that is to be used for rendering subsequent frames to be rendered;
  rendering a second version of the frame that is to be used for rendering subsequent frames to be rendered;
  generating a set of information representative of the content of the second version of the frame that is to be used for rendering subsequent frames to be rendered; the method further comprising:
  comparing the set of information indicative of the content of the first version of the frame that is to be used for rendering subsequent frames to be rendered to the set of information indicative of the content of the second version of the frame that is to be used for rendering subsequent frames to be rendered; and
  determining whether the first and second versions of the frame that is to be used for rendering subsequent frames to be rendered match or not based on the results of the comparison.

A second embodiment of the technology described herein comprises a graphics processing system, the graphics processing system comprising:
  a graphics processor, the graphics processor comprising:
    a rendering circuit operable to render frames; and
    a processing circuit configured to generate a set of information representative of the content of a frame that the graphics processor has rendered;
  and
  a host processor operable to control the graphics processor to render frames;
  the host processor comprising a processing circuit configured to, when the graphics processor is to render a frame that is to be used for rendering subsequent frames to be rendered, cause the graphics processor to:
    render a first version of the frame that is to be used for rendering subsequent frames to be rendered;
    generate a set of information representative of the content of the first version of the frame that is to be used for rendering subsequent frames to be rendered;
    render a second version of the frame that is to be used for rendering subsequent frames to be rendered; and
    generate a set of information representative of the content of the second version of the frame that is to be used for rendering subsequent frames to be rendered; the graphics processing system further comprising:
  a comparison circuit configured to:
    compare a set of information indicative of the content of a first version of a frame that is to be used for rendering subsequent frames to be rendered to a set of information indicative of the content of a second version of the frame that is to be used for rendering subsequent frames to be rendered; and
    determine whether the first and second versions of the frame that is to be used for rendering subsequent frames to be rendered match or not based on the results of the comparison.

The technology described herein relates to the situation where a graphics processor is rendering a frame that will then be used for (when) rendering subsequent frames. This may be the case, for example, where the graphics processor is being used to render a texture, which will then be used as a texture when rendering subsequent frames (e.g. in a so-called "render-to-texture" operation).

The Applicants have recognised in this regard that such render-to-texture operation, for example, may be relatively common in safety-critical graphics processing applications. For example, in the case of a cockpit display in a vehicle, the graphics processor may be required to render a base or background image that will then be used from then on as all or part of the cockpit display whilst the vehicle is in use.

In this case, the initial "render-to-texture" frame may therefore be rendered once (and stored), with that initially rendered frame (texture) then being repeatedly re-used while the vehicle is in use, e.g. by combining it with other, "live" frames that are being rendered to provide "live" information while the vehicle is in use.

The Applicants have further recognised that any error that is caused by a fault during the operation of the graphics processor when initially rendering the frame (texture) that is to be re-used when rendering subsequent frames will be present whenever the initially rendered frame is used for a subsequent rendered frame. The Applicants have correspondingly recognised that it would therefore be desirable to try to identify and avoid the presence of errors caused by faults when generating such an initial frame that is then to be used when rendering subsequent frames.

This should be contrasted with the presence of faults causing errors in frames that are to be used (e.g. displayed) in a one-off manner, such that any error due to the presence of a fault will be present in the single instance of that frame only. Faults in such "one off" frames can be avoided by having the graphics processor render the frames being displayed at a sufficiently fast rate to avoid any faults in the frames persisting for longer than a desired "fault tolerant" time window. This will not be an issue where the frames are to be refreshed for display in any event, e.g. because the information that they are displaying is changing in any event.

The technology described herein in contrast recognises and is concerned with the possibility of errors caused by faults when generating a frame being propagated to more than just that frame because the frame will be used when generating other frames as well.

While it would in this case again be possible to re-render the initial, base frame periodically so that a new version of the frame is generated at least once in a given "fault tolerant" time interval, the Applicants have recognised that that may in general place an undesirable burden on the processing resources and time of the graphics processor, and/or increase application complexity (e.g. in terms of having to periodically submit the texture for re-rendering).

As will be discussed further below, the technology described herein accordingly instead addresses the issue of potential faults causing errors in an initially rendered, "base" frame by, when that frame is initially rendered, rendering it twice, and comparing the two versions of the frame that have been rendered to determine if they match or not.

As will be discussed further below, this then allows the presence of any transient faults that may have caused an error in the rendering of the initial frame to be detected (and thereby, e.g., to trigger an error operation), as if the two versions of the frame that have been rendered do not match, it can be assumed that there was a (transient) fault when at least one of the versions of the frame was rendered.

On the other hand, if the two versions of the frame match, it can reasonably be assumed that there was no (transient) fault present when the two versions of the frame were rendered, and so it can reasonably be assumed that the rendered frame is "safe" to use without the need, e.g., to periodically refresh that frame (thereby reducing the processing burden on the graphics processor and graphics processing system).

While the operation in the manner of the technology described herein may increase the processing burden when initially rendering the initial frame, the Applicants believe that it will be less of a burden on the graphics processing system overall than other arrangements, such as, for example, periodically re-rendering the initial frame to provide a new version of that initial frame in which (it will be hoped) the fault no longer persists.

Furthermore, in the technology described herein, the two versions of the (initial) frame that are rendered are compared by comparing information representative of the content of the two versions of the frame, rather than the versions of the frame themselves. This then makes the comparison process more efficient, as it does not, for example, require a, e.g., pixel-by-pixel, comparison of the two rendered versions of the frame. The Applicants have recognised in this regard that comparing information representative of the content of the two rendered versions of the frame is sufficient to identify whether there was any (transient) fault when rendering one of the versions, such that it is acceptable to use such a process for determining whether faults were present when rendering the frame in a safety-critical graphics processing environment.

The technology described herein can be used in any graphics processing application where an initial frame that is rendered will be repeatedly re-used when rendering subsequent frames, e.g. and in which it is important to avoid the persistent presence of faults in the subsequently rendered frames. Thus the technology described herein is particularly, but not exclusively, applicable to use for graphics processing applications that are "safety critical", such as where the graphics processing system is being used to generate all or part of a display that includes safety information, and/or that it is desired to be accurate for safety reasons, such as in the case of vehicular displays (e.g. automotive, tractors, trains, planes), (industrial) machinery, robots, medical displays (in medical devices), etc.

The frame that is being rendered that is to be used for rendering subsequent frames by the graphics processor can be any suitable and desired render output (frame) that a graphics processor can be used to generate. In an embodiment, the frame is an image that is to be used for (and when) rendering subsequent frames.

Correspondingly, the subsequent frames that are rendered using the initially rendered frame can comprise any suitable and desired output that a graphics processor can be used to generate, but in an embodiment comprise output frames, and in an embodiment images, in an embodiment that are to be displayed.

The initially rendered frame can be used in any suitable and desired manner for rendering subsequent frames by the graphics processor. For example, it could be composited with other input frames (e.g. images) to provide the rendered frame(s). In an embodiment, the initially rendered frame is used as an input, and in an embodiment as a texture, when rendering the subsequent frames.

The initially rendered frame could be used only for a single subsequent frame that is rendered by the graphics processor, but in an embodiment is used for plural subsequent frames that are rendered by the graphics processor and in an embodiment for a sequence of plural frames being rendered by the graphics processor, such as, and in an embodiment, a sequence of frames (images) to be displayed.

Thus, in an embodiment, the initially rendered frame is to be used as, and is used as, a texture that is then used when rendering a sequence of output frames (images) to be displayed.

The subsequent frames rendered by the graphics processor can correspondingly be used as desired. In an embodiment they are appropriately displayed on a display of the device or system that the graphics processor is part of, and in an embodiment displayed to a user.

The first and second versions of the frame that is to be used by the graphics processor for rendering subsequent frames can be rendered in any suitable and desired manner, such as, and in an embodiment, in the normal manner for rendering frames for the graphics processor and graphics processing system in question. The technology described herein is applicable irrespective of how the graphics processor is operated to actually render the frames in question.

In an embodiment, the two versions of the frame are generated independently, and under their own independent conditions. Thus, in an embodiment the graphics processor is reset between generating the two versions of the frame, e.g., and in an embodiment, at least so as to clear any data stored in caches (from the generation of the first version). This should help to avoid the same transient fault(s) affecting both generated versions of the frame.

The graphics processor can be triggered to generate the two versions of the initial frame (the host processor can cause the graphics processor to generate the two versions of the initial frame) in any suitable and desired manner.

In one embodiment this is done by submitting the frame for generation by the graphics processor twice (e.g. by the driver for the graphics processor).

Additionally or alternatively, the graphics processor could be caused to generate the two versions of the initial frame by an appropriate indication, e.g. flag, that triggers that operation being set in appropriate control data (e.g. a control structure) provided to the graphics processor (in response to which, e.g. flag, being set, the graphics processor would then operate to render the two versions of the initial frame, together with the content-indicating information, etc., in the manner of the technology described herein). In this case, the host processor (e.g. driver) would accordingly set the, e.g. flag, to trigger the required operation of the graphics processor (rather than the, e.g. driver, itself submitting the frame for generation by the graphics processor twice).

In either case, in an embodiment the operation in the manner of the technology described herein is triggered by an appropriate request or indication that such operation is required from an, e.g., application, that requires the graphics processing in question. In this case, the application would indicate a requirement for the operation in the manner of the technology described herein, with the, e.g. driver on the, host processor then operating accordingly to trigger the graphics processor to generate the two versions of the initial frame, etc.

At least one of the versions of the frame being rendered should be, and is in an embodiment, stored, e.g., and in an embodiment, in memory, for subsequent use when rendering the subsequent frames.

It would be possible in this regard for the graphics processor to store both the first and second versions of the frame that it generates (e.g. to memory), but in an embodiment only one version of the frame is stored to memory, as that then saves on memory bandwidth, etc. In an embodiment the first version of the frame that is rendered by the graphics processor is stored to memory for future use, with the second version of the frame, while being generated by the graphics processor, not being written out to memory from the graphics processor (but, e.g., simply being discarded once the relevant content indicating information for that version of the frame has been generated).

Correspondingly, in an embodiment only one version of the initial frame (and thus in an embodiment the first version of the initial frame) should be, and is in an embodiment, used by the graphics processor when rendering subsequent frames to be rendered.

Thus, in an embodiment, the method of the technology described herein comprises (and the graphics processor is correspondingly caused to, and operates to):

generating and storing to memory the first version of the frame for use when rendering subsequent frames; and generating but not storing to memory for subsequent use the second version of the frame.

In this case therefore, the graphics processor will operate and be caused to, when rendering the first version of the frame, to render that first version of the frame, generate a set of content indicating information for that version of the frame, and store the rendered first version of the frame to memory, but would operate and be caused to when rendering the second version of the frame, generate the second version of the frame and a set of content indicating information from that second version of the frame, but without (and not) storing the rendered second version of the frame to memory.

This operation can be achieved in any suitable and desired manner, for example by disabling the output write out operation of the graphics processor when generating the second version of the frame.

The information representative of the content of the versions of the frame that is generated (and compared) in the technology described herein can be any suitable and desired information that is representative of the content of the versions of the frame. It is in an embodiment based on and/or derived from the content of the versions of the frame.

It will be appreciated in this regard that (each version of) the frame will comprise an appropriate array of data positions, with each data position in the frame having an associated set of data values, such as, and in an embodiment, an appropriate set of colour values (thereby forming the content of the (version of the) frame).

In an embodiment, the information representative of the content of the version of the frame is in the form of one or more "signatures" for the version of the frame, which signature(s) are generated from (based on) the content of the version of the frame. Such a content-indicating "signature" may comprise, e.g., and in an embodiment, any suitable set of derived information that can be considered to be representative of the content of the frame, such as a checksum, a CRC, or a hash value, etc., derived from (generated for) the version of the frame. Suitable signatures would include standard CRCs, such as CRC32, or other forms of signature such as MD5, SHA-1, etc.

Thus a respective signature, such as the CRC or hash value, will be generated from the, e.g. colour, values for some or all of the data positions of the version of the frame for which the content-representing signature is being generated.

Correspondingly, the graphics processor in an embodiment comprises a suitable "signature" generating circuit, such as a circuit that executes a CRC function or a hash function, to thereby generate a content-indicating signature, for a respective set of input data values.

The content-indicating signatures that are generated and compared can be generated for and/or based on any suitable and desired content of the version of the frame in question.

For example, it would, e.g., be possible to generate a single signature for the, e.g., RGBA, colour planes altogether, or a separate signature (e.g. CRC) could be generated for each colour plane. Similarly, colour conversion could be performed and a separate signature generated for the Y, U, V planes if desired.

The signatures may be weighted towards a particular aspect of the content as compared to other aspects of the content. For example, a longer (more accurate) signature may be generated for the MSB bits of the, e.g. colour, values as compared to the LSB bits of the, e.g. colour, values. It would also be possible, e.g., to generate (and compare) separate MSB and LSB signatures, if desired.

While it would be possible to generate, e.g., a single "signature" representative of the content of a version of the frame that is to be used for rendering subsequent frames, in an embodiment, plural content-indicating signatures are generated for each version of the frame. In an embodiment a content-indicating signature is generated for each of a plurality of respective (and different) regions that the versions of the frame that is to be used for rendering subsequent frames are divided into (for the signature generation and comparison process).

Thus, in an embodiment, each set of information representative of the content of a respective version of the frame that is to be used for rendering subsequent frames to be rendered comprises a plurality of content-indicating signatures, and in an embodiment a set of plural content-indicating signatures for a respective set of regions that the version of the frame has been divided into for the signature generation and comparison process.

This may be particularly applicable where the graphics processor operates to render frames on a region-by-region (e.g. tile-by-tile) basis, as in that case a respective content-indicating signature may be generated for each respective region (e.g. tile) of the (version of the) frame that the graphics processor generates.

Thus, in an embodiment, each version of the frame that is being rendered is divided into plural smaller regions for the purpose of the signature generation and comparison process. In this case, the two versions of the frame are in an embodiment subdivided into corresponding and matching sets of regions (i.e. having the same positions, sizes and configurations).

Each version of the frame can be divided into any suitable and desired number of regions for this purpose. Each region should comprise an appropriate (different) portion (area) of the frame, such as a plurality of data positions within the frame. Suitable region sizes would be, e.g., 8×8, 16×16 or 32×32 data positions in the (version of the) frame.

Each of the regions is in an embodiment the same size and shape (i.e. contains the same number and configuration of data positions of the version of the frame). The regions are in an embodiment rectangular, and in an embodiment square.

In an embodiment, each region corresponds to a rendered tile that the graphics processor produces as its rendering output. This is a particularly straightforward way of implementing the technology described herein, as the graphics processor will generate the rendering tiles directly, and so there will be no need for any further processing to "produce" the regions that will be considered and compared in the manner of the technology described herein.

Thus, in an embodiment, a content-indicating signature is generated for each of plural regions for each version of the frame that is rendered, and the comparison process comprises comparing the signatures of the respective regions from each generated version of the frame.

The information, e.g. signature(s), indicative of the content of the first and second versions of the frame that is to be used for rendering subsequent frames to be rendered can be compared in any suitable and desired manner to determine whether the first and second versions of the frame match or not.

In an embodiment, the information, e.g. signatures, indicative of the content of the first and second versions of the frame is compared to see whether that content-indicating information, e.g. signatures, matches or not, and it is then determined whether the first and second versions of the frame match or not based on whether the information, e.g. signatures, indicative of the content of the first and second versions of the frame matches or not.

In one embodiment, the comparison of the information representative of the content of the versions of the frame (e.g. the content-indicating signatures), requires an exact match of that information, e.g. signatures, for it to correspondingly be determined that the two versions of the frame match.

In another embodiment, the comparison of the information, e.g. signatures, representative of the content of the versions of the frame does not require an exact match for it to be determined that the two versions of the frame match, but only that the information representative of the content, e.g. signatures, are sufficiently similar to each other for there to be a determination that the two versions of the frame match. For example, it could be determined that the, e.g. signatures, match sufficiently for there to be a determination that the two versions of the frame match, if a particular, in an embodiment selected, in an embodiment predetermined "threshold" number of the most significant bits (MSBs) of the information, e.g. signatures, match (without, e.g., requiring all of the LSBs of the information, e.g. signatures, to match).

In general, the comparison should be, and is in an embodiment, operable to determine whether the two versions of the initial frame are "visually" identical, which may be, for example, determined to require an exact match between the two versions of the frame, or, for example, allow for some slight variations in colour between the two frames. In an embodiment, it can be configured, e.g., and in an embodiment, by the application that requires the graphics processing, whether an exact match or only a "close" match is required (e.g. in the case where the graphics processing system supports both those forms of comparison determination).

Additionally or alternatively, in the case where a plurality of, e.g., signature, comparisons on a region-by-region basis are performed, in one embodiment it is only determined that the first and second versions of the frame match if the respective comparisons for the individual regions indicate that all of the respective regions match each other (or at least are sufficiently similar to each other).

However, it would also be possible to allow, for example, particular, in an embodiment selected, in an embodiment predetermined, parts (areas) of the two versions of the initial frame to not match based on the signature comparisons, but for it still to be determined that the first and second versions of the frame (sufficiently) match each other.

This could be used, for example, in situations where it is desired (and e.g. critical) that certain parts (areas) of the first and second versions of the frame are rendered correctly and thus should (sufficiently) match each other, but it does not matter (and there is no concern) whether other parts (areas) of the first and second versions of the frame are rendered correctly (and thus (sufficiently) match each other). For example, there could be specific parts (areas) of the initial frame where it does not matter whether there is a fault or not, e.g. because that part of the frame will be overwritten in any event when generating an output frame, such that any errors in that to be overwritten part or parts can be tolerated.

In this case therefore, the comparison process may operate to consider only some but not all of the individual regions, such as a particular, in an embodiment selected, in an embodiment predetermined set of some but not all of the regions, to determine whether they match each other (or at least are sufficiently similar to each other), to determine whether the first and second versions of the frame (sufficiently) match each other (for the frame to then be used when rendering subsequent frames).

This operation may be triggered, e.g., by, e.g., the application that requires the graphics processing, indicating the specific parts (areas) of the frame to be compared (and/or not to be compared) (and/or the specific areas (parts) of the frame where the result of the comparison must be considered and/or can be ignored (i.e. for which it does not matter if the comparison indicates that a fault may be present)).

In the case where only a single signature is generated for each version of the frame, then those two signatures should be compared to determine whether the two versions of the frame match or not.

Correspondingly, in the case where a plurality of content-indicating signatures are generated for each version of the frame, e.g. for respective regions of the versions of the frame as discussed above, then the respective sets of plural signatures should be compared in an appropriate manner. In this case, the signatures are in an embodiment compared on a region-by-region basis, i.e. such that the signatures for corresponding regions (i.e. having the same position and containing the same data positions) in the two different versions of the array are compared with each other (and each region in the first version of the frame is compared with one (and only one) region of the second version of the frame, namely the region in the second version of the frame that corresponds to the region in question). In this case therefore there will be a plurality of "signature" comparisons between the two different versions of the frame, one for each region that the respective versions of the frame have been divided into (and that are to be compared).

Thus, in an embodiment, the comparison comprises, for one or more regions and in an embodiment for plural regions, and in an embodiment for each region, that the first version of the frame has been divided into, comparing a content-indicating signature for that region of the first version of the frame to a content-indicating signature for the corresponding region of the second version of the frame, to determine if those signatures match or not. This will be done for one or more respective pairs, and in an embodiment for plural respective pairs, and in an embodiment for each respective pair, of corresponding regions that the versions of the frame have been divided into for this purpose.

The content-indicating information (e.g. signatures) for the first and second versions of the frame will be used for the appropriate comparison operation, but can be, and are in an embodiment, discarded thereafter (as that information will not be needed for rendering subsequent frames once the match/no match decision has been made).

Correspondingly, depending upon where the comparison of the content-indicating information is to be made, that information for either or both of the first and second versions of the frame may be written out to memory, or the content-indicating information for one or both of the first and second versions of the frame may, e.g., be retained in the graphics processor and not actually written out from the graphics processor to memory. In either case, the content-indicating information can be, and is in an embodiment, discarded once it has been used for the comparison process.

When it is determined from the comparison of the sets of information (e.g. signatures) representative of the content of the first and second versions of the frame that is to be used for rendering subsequent frames that the first and second versions of the frame match, then it can be, and is in an embodiment, correspondingly determined that the rendered first (or second) version of the frame can (safely) be used by the graphics processor for (and when) rendering subsequent frames (as it can be concluded that the first and second versions of the frame were generated without (transient) errors, such that it is then okay to use the frame for rendering subsequent frames). In this case therefore, (one version of) the rendered frame will then be used by the graphics processor for (and when) rendering subsequent frames.

Thus, in an embodiment, the method of the technology described herein comprises (and the graphics processing system is correspondingly configured to), when it is determined that the first and second versions of the frame that is to be used for rendering subsequent frames match, the graphics processor using one of the first and second versions of the frame when rendering subsequent frames (rendering one or more subsequent frames using one of the first and second versions of the frame).

As discussed, in this case, the subsequent frames that are rendered using the initial frame in an embodiment comprise a sequence of output frames (images) to be displayed, and thus in an embodiment, in the case that the first and second versions of the frame that is to be used for rendering subsequent frames are determined to match (one of the versions of) the frame is then used (in an embodiment as a texture) when and for rendering a sequence of frames (images) to be displayed.

On the other hand, when it is determined from the comparison of the information, e.g. signatures, indicative of the content of the first and second versions of the frame that is to be used for rendering subsequent frames that the first and second versions of the frames do not (sufficiently) match, then it can be, and is in an embodiment, determined that neither the first nor the second version of the output should be used for rendering subsequent frames by the graphics processor (as it can be determined that an error or fault occurred when rendering one or both of the first and second versions of the frame). In this case, the graphics processing system in an embodiment then proceeds instead to perform some form of, particular, in an embodiment selected, in an embodiment predefined, "error" operation.

The error operation that is performed in the case where it is determined that the first and second versions of the frame do not match can be any suitable and desired operation to be used in that event.

For example, the graphics processor could be caused to (controlled to) render two new versions of the frame and again compare those versions, with that operation then, e.g., being repeated as required, e.g. until two versions of the frame that are determined to match are achieved (with the graphics processor then using that "safe" version of the frame when rendering subsequent frames (as discussed above) (e.g., up until a particular, in an embodiment selected, in an embodiment predefined, number of "re-tries" have been attempted).

The graphics processor could also or instead be caused to render a default output, e.g. image, that, e.g. provides an error message for display, and/or to use some other particular, in an embodiment selected, in an embodiment pre-generated, frame when rendering the subsequent frames, e.g. images for display, in place of the frame that it attempted to generate. For example, the frame that the graphics processor is attempting to generate could be a customised or bespoke image, such as a cockpit display, but in the event that the graphics processor is unable to generate a "safe" version of that image, the graphics processor could instead default to a predefined image (e.g. cockpit display) that is known to be "safe" (and that is, e.g., stored in memory for use by the graphics processor in this event).

This could be done, e.g., immediately there is a failure to render the frame, or only after a particular number of "re-tries" have failed as well.

Other arrangements would, of course, be possible.

The operation as a result of the comparison and match determination may be triggered and controlled by any suitable and desired component (element) of the graphics processing system, e.g., and in an embodiment, in dependence upon where the comparison and the determination of whether the first and second versions of the frame that is to be used for rendering subsequent frames match is made.

For example, where the comparison and "match" determination is made otherwise than on the graphics processor itself, such as where the comparison and "match" determination is made by another processor, such as a host processor, of the graphics processing system, then that, e.g. host, processor can then, and in an embodiment does, operate to determine what action to take in the event of the error situation (and, e.g., to trigger the graphics processor to render new or different frames accordingly (as discussed above)). In one embodiment, the "error" event is reported to the application that requires the graphics processing, with the application then determining how to proceed in that event.

On the other hand, in the case where the comparison and the determination of whether the first and second versions of the frame that is to be used for rendering subsequent frames match is performed by or on the graphics processor itself, then the graphics processor should be and is in an embodiment, configured to operate (and operates) accordingly, e.g. in the event that an error situation is identified.

In an embodiment where the graphics processor itself performs the comparison and "match" determination, in the case of a "non-match" the graphics processor signals (reports) the identification of that error situation to another processor, such as a host processor, of the graphics processing system that the graphics processor is part of, with that other, e.g. host, processor then determining how to proceed, and, e.g. causing the graphics processor to operate in the desired manner, such as, for example, trying again, using an alternative frame for rendering the subsequent images to be displayed, and/or rendering an "error" image to be displayed (as discussed above).

In a such embodiment, the graphics processor reports the error to a driver for the graphics processor, with the driver then deciding how to proceed, e.g. re-submit the initial frame for rendering, or report an error to the application and let it decide what to do, etc.

The comparison of the information indicative of the content of the first and second versions of the render output and the determination of whether the first and second versions of the rendered frame match or not can be performed by any suitable and desired element or component of the graphics processing system that the graphics processor is part of.

In one embodiment, this is done by a processor of the system other than the graphics processor, such as, e.g., and in an embodiment, a host processor or other CPU of the overall graphics processing system.

In this case, the graphics processor would be configured to, and in an embodiment operates to, generate the two versions of the frame in question, together with respective sets of content indicating information for those versions of the frame, and then provide the relevant content indicating information for each version of the frame to the other, e.g. host, processor, with the other, e.g. host, processor then comparing the two sets of content indicating information to determine whether the first and second versions of the frame matched or not.

In this case therefore, the graphics processor would, e.g., and in an embodiment, output the content indicating information for each version of the frame to appropriate storage, e.g. memory, from where the, e.g. host, processor would then retrieve that information and perform the comparison accordingly. Thus, in one embodiment, the graphics processor outputs one (and in an embodiment the first) rendered version of the frame that is to be used when rendering subsequent frames, together with the set of content indicating information for the first version of that frame, and the set of content indicating information for the second version of the frame, to memory.

It would also or instead be possible for the graphics processor to perform the comparison of the content indicating information and the "match" determination itself. Again, this could be done by storing the content-indicating information, e.g. either locally to the graphics processor or in memory, with the graphics processor then retrieving that information appropriately and comparing it.

However, in an embodiment, the graphics processor compares (and comprises a processing circuit configured to compare) the content indicating information for the second version of the frame to the corresponding content indicating information for the first version of the frame as the second version of the frame is being generated. This may then, for example, and inter alia, avoid the need to write the content indicating information for the second version of the frame to memory.

This may particularly be appropriate in the case where the graphics processor generates the versions of the frames as respective regions (tiles), one after another, as in that case it would then be possible to compare each region of the second version of the frame as it is generated to the corresponding region of the first version of the frame, to determine whether the regions match or not (as discussed above). This would then allow the region-by-region comparison and matching process to be performed as the graphics processor generates the second version of the frame (and on and by the graphics processor itself, without the need to export the relevant data, e.g. to memory, for analysis by another processor).

Thus, in an embodiment, the graphics processor operates to (and is correspondingly configured to):

generate the first version of the frame by generating respective regions of the first version of the frame in turn; and generate for each region that it generates for the first version of the frame, a corresponding set of information (e.g. and in an embodiment a signature) representative of the content of that region of the first version of the frame;

and when generating the second version of the frame (thereafter):

generates the second version of the frame by generating respective (and, in an embodiment, corresponding) regions of the second version of the frame in turn; and generates for each region that it generates for the second version of the frame, a corresponding set of information (e.g. and in an embodiment a signature) representative of the content of that region of the second version of the frame;

and when a region for the second version of the frame has been generated, compares the set of information representative of the content of the region of the second version of the frame to the previously generated set of information representative of the content of the corresponding region for the first version of the frame and determines whether the region of the second version of the frame matches the corresponding region of the first version of the frame or not based on the results of the comparison.

In this case therefore, the content-indicating information for the regions of the second version of the frame will be compared to the content-indicating information for the corresponding regions of the first version of the frame as the regions of the second version of the frame are generated by the graphics processor. (The regions are in an embodiment the rendering tiles that the graphics processor produces.)

In this embodiment, the system in an embodiment further operates (and is configured) such that the regions for the second version of the frame are not (are other than) written to memory, irrespective of whether the regions are determined to match or not. Thus any writing of the second version of the frame to memory is, as discussed above, in an embodiment disabled.

This can be achieved as desired. For example, and as will be discussed in more detail below, the graphics processor may be configured to (attempt to) write any mis-matching regions for the second version of the frame to memory, but with the graphics processor memory management unit (MMU) then being configured to detect and block such writes to memory (such that the regions will not be written to memory) and, e.g., and in an embodiment, also report an error in that event.

In the event that all the (to be compared) regions for the second version of the frame are determined to (sufficiently) match their respective corresponding regions in the first version of the frame, then it can be, and is in an embodiment, correspondingly determined that the first and second versions of the frame match (and thus that the (first version of the) frame can be used for rendering subsequent frames). In this case, the graphics processor may, e.g., then operate to render subsequent frames using the initial frame, and/or signal the event of a successful match to another, e.g., host, processor, for the desired operation then to be triggered.

On the other hand, in the event that the comparison of the content-indicating information, e.g. signatures, determines that one (or more) of the regions in the first and second versions of the frame did not match, then that in an embodiment triggers an appropriate "error" operation by the graphics processor, e.g., and in an embodiment, as discussed above. Thus the graphics processor may, e.g., report the error event to another, e.g. host, processor of the graphics processing system (for that other processor to then trigger and control the desired error operation).

In an embodiment, the error operation is triggered immediately a region of the second version of the frame is found not to match its corresponding region of the first version of the frame (e.g. rather than waiting until the second version of the frame has been generated in its entirety and then triggering the error operation (if required)). Thus in this case therefore, the graphics processor will generate the second version of the frame on a region-by-region basis, and the error operation will be triggered by the first region of the second version of the frame that is found not to match the corresponding region in the first version of the frame (and immediately that "non-match" determination is made).

Correspondingly, in a such embodiment, the rendering of the second version of the frame will be stopped (aborted) at the point that an error is identified. Thus in this case at least, the rendering of the second version of the frame will comprise rendering only some but not all of the second version of the frame (and correspondingly generating content-indicating information for only some but not all of the second version of the frame).

In this embodiment, the content-indicating information, e.g. signatures, are in an embodiment generated and then compared for the regions of the second version of the frame as those regions are being generated (and on a region-by-region basis), with the content-indicating information, e.g. signature, for a given region of the second version of the frame only being retained while and for so long as required for the comparison process. Thus the content-indicating information, e.g. signatures, for the regions of the second version of the frame will be discarded once the relevant region comparison has been performed.

The graphics processor will correspondingly need the content-indicating information, e.g. signatures, for the regions of the first version of the frame for the purposes of the comparison as the second version of the frame is being generated. The graphics processor can access this information for the regions of the first version of the frame in any suitable and desired manner. For example, the graphics processor could write the content-indicating information, e.g. signatures, for the regions of the first version of the frame out to memory, and then retrieve that content-indicating information as required from the memory when needed to compare with the content-indicating information, e.g. signature, for a region of the second version of the frame (and in one embodiment, this is what is done).

Alternatively or additionally, the graphics processor could operate to store some or all of the content-indicating information, e.g. signatures, for the regions of the first version of the frame locally (e.g. cache that data locally). That may avoid the need to fetch the content-indicating information for the first version of the frame from external memory when the comparisons with the second version of the frame need to be made.

Thus, in an embodiment, the, e.g. signatures, for one or more regions, and in an embodiment for a plurality of regions, can be and are cached locally to the comparison circuit, e.g. on the graphics processor itself, for example in an on-chip, e.g. signature, buffer.

The content-indicating information, e.g., signature, comparisons, and the determination of whether the regions match and the corresponding normal or error operation can be performed by any suitable and desired processing circuit and element of the graphics processor. For example, the graphics processor may include a dedicated comparison and determination circuit for this purpose.

In an embodiment, where the graphics processor generates output frames on a region by region (e.g. tile by tile) basis, the graphics processor includes a "write transaction elimination" circuit that is configured to compare content-indicating information, e.g. a signature, for a region for an output frame to be written out from the graphics processor (e.g. to (e.g. a frame buffer in) memory) to content-indicating information, e.g. a signature, for a region of an output frame that has previously been written out by the graphics processor (e.g. for a preceding frame), to determine whether to write out the new frame region, e.g. to the frame buffer, or not (with the write transaction elimination circuit operating to prevent the write out of (to not write out) the new frame region in the event that the content-indicating information indicates a match between the regions being compared but to write out the new frame region in the event that the content-indicating information does not (other than) indicates a match between the regions being compared), and that write transaction elimination circuit and operation is used to perform the signature comparisons and "match" determinations of the technology described herein.

In the case of this operation for the technology described herein, the write transaction elimination circuit and operation will accordingly be, and is in an embodiment, configured to perform "write transaction elimination" for the regions of the second version of the frame as they are rendered (i.e. to compare the content-indicating information for the regions of the second version of the frame to the content-indicating information for the corresponding regions of the first version of the frame, to, in effect, determine whether to write out the regions of the second version of the frame or not).

In this case, if (when) the write transaction elimination operation determines that none of the regions of the second version of the frame should be written out, that will indicate that the first and second versions of the frame match (and so can, e.g., be signaled appropriately).

On the other hand, if (when) the write transaction elimination operation determines that a region of the second version of the frame should be written out (i.e. it is not determined to match the corresponding region in the first version of the frame), that will indicate that the first and second versions of the frame do not match. This can then be used to trigger the appropriate error operation (as discussed above).

This can be done as desired, but in an embodiment this operation is implemented as part of, and performed by, an appropriate write out unit (circuit) of the graphics processor, that controls the writing of data generated by the graphics processor to memory, and in an embodiment by a memory management unit (MMU) of the graphics processor.

In this case, the write out unit (e.g. MMU) in an embodiment, in response to a write operation for a region of the second version of the frame, does not complete (other than completes) (blocks) that write operation, and instead signals an error event, e.g. to the host processor (as discussed above).

Thus, in an embodiment, the write transaction elimination circuit will send a write transaction for a region of the second version of the frame (that doesn't match the corresponding region in the first version of the frame) to an, e.g., MMU for the graphics processor, with the, e.g. MMU, recognising that event, and in response thereto, not completing (blocking) that write operation, and instead signaling an error event, e.g. to the host processor.

Other arrangements would, of course, be possible.

Although the technology described herein has been described above primarily with reference to the avoiding of (transient) faults when rendering a frame (e.g. texture) that will be used for rendering subsequent frames, the Applicants have recognised that the technology described herein may equally be used to (try to) avoid errors due to (transient) faults when rendering frames more generally, i.e. to perform "transient" safe rendering in general, e.g. where the graphics processing system and hardware is not otherwise guaranteed to be free or safe from transient faults when operating.

For example, it could be the case that a graphics processing system is being used to render a safety-critical display itself, such as to display a sensor output, that will simply be displayed (without being used as an input for a subsequent frame), and which display may persist longer than a suitable "fault-tolerant" interval, such as only being updated when the sensor output changes. In this case therefore, the initial rendered frame to display the sensor output would remain being displayed e.g. until there was a change in the user interface required, such as there being a change in the sensor output.

In this case, if the sensor value is not changing, the system may not automatically redraw the frame for display within any given "fault-tolerant" time window, such that the frame being displayed could be displayed and persist for a relatively long period of time. The Applicants have accordingly again recognised that in such a situation, the presence of errors in the frame being displayed due to transient faults when rendering that frame would be undesirable.

Thus the technology described herein also extends to the use of the technology described herein more generally for rendering frames in a manner so as to avoid the presence of errors caused by transient faults when rendering a frame.

Thus, another embodiment of the technology described herein comprises a method of operating a graphics processing system that includes a graphics processor operable to render frames, the method comprising:
  the graphics processor, when rendering a frame:
    rendering a first version of the frame;
    generating a set of information representative of the content of the first version of the frame;
    rendering a second version of the frame; and
    generating a set of information representative of the content of the second version of the frame;
  the method further comprising:
    comparing the set of information indicative of the content of the first version of the frame to the set of information indicative of the content of the second version of the frame; and
    determining whether the first and second versions of the frame match or not based on the results of the comparison.

Another embodiment of the technology described herein comprises a graphics processing system, the graphics processing system comprising:
  a graphics processor, the graphics processor comprising:
    a rendering circuit operable to render frames; and
    a processing circuit configured to generate a set of information representative of the content of a frame that the graphics processor has rendered;
  and
  a host processor operable to control the graphics processor to render frames;
    the host processor comprising a processing circuit configured to cause the graphics processor to, when rendering a frame:
      render a first version of the frame;

generate a set of information representative of the content of the first version of the frame;

render a second version of the frame; and generate a set of information representative of the content of the second version of the frame;

the graphics processing system further comprising:

a comparison circuit configured to:

compare a set of information indicative of the content of a first version of a frame to a set of information indicative of the content of a second version of the frame; and determine whether the first and second versions of the frame match or not based on the results of the comparison.

As will be appreciated by those skilled in the art, these embodiments of the technology described herein can, and in an embodiment do, include any one or more or all of the optional features of the technology described herein.

Thus, for example, the content-indicating information is in an embodiment in the form of appropriate content-indicating signatures, and in an embodiment such signatures for respective regions of the frame, as discussed above.

Correspondingly, the frame version comparisons and match determinations are in an embodiment carried out in one of the manners discussed above.

Correspondingly, in the event that the comparison of the content-indicating information for the two versions of the frame indicate that the versions match, then one of the versions (e.g. the first version) of the frame is in an embodiment then used as intended, e.g., and in an embodiment, as all or part of a display on a display (e.g. screen) or as a texture when rendering subsequent frames, etc. (and the other version is in an embodiment discarded, and in an embodiment not written out to memory at all by the graphics processor), but if the content-indicating information comparisons determine that the two versions of the frame do not match, then an appropriate error operation is performed. Again, this can be and is in an embodiment controlled and triggered in one or more of the manners discussed above.

In one embodiment the frame being rendered is a frame for display, but as discussed above, it may be a frame that is to be used when rendering subsequent frames, such as a texture.

The Applicants have recognised that there may be situations where it is desired (and e.g. critical) that a portion of an (initial) frame being rendered (such as, e.g., a portion of the frame which contains a key user interface component such as a warning icon) is correct, but, e.g., it may not matter whether another, e.g. less critical, portion of the frame is correct, and that in that case, it would be possible to, rather than rendering an entire second version of the frame for the purposes of comparing that version to the originally rendered (i.e. initial, base) version of the frame, instead only render a portion of the frame again that corresponds to the (e.g. critical) portion of the frame that it is desired to be correct (with that (e.g. critical) portion of the frame then being compared to the corresponding portion of the originally rendered (i.e. initial, base) version of the frame, in order to determine whether the portion of the frame generated again matches the corresponding portion of the originally generated frame).

The Applicants have further recognised that, by rendering only a portion (rather than an entirety) of the frame again (and then only comparing that re-rendered portion to the corresponding portion of the originally-rendered frame), significant savings in terms of rendering cost may be achieved, whilst still ensuring that the desired (and e.g. critical) portion of the frame has been rendered correctly.

Therefore, in an embodiment of the technology described herein, the method includes (and the system is configured to), when rendering the first version of the frame, rendering the frame in its entirety, but when rendering the second version of the frame, rendering only a portion of the frame, and then comparing the rendered portion of the second version of the frame to a corresponding portion of the first version of the frame.

Correspondingly, another embodiment of the technology described herein comprises a method of operating a graphics processing system that includes a graphics processor operable to render frames, the method comprising:

the graphics processor, when rendering a frame:

rendering a first version of a frame; and rendering a second version of the frame;

wherein the graphics processor renders the first version of the frame in its entirety, but only renders a portion but not all of the second version of the frame; and the method further comprises:

comparing the rendered portion of the second version of the frame to a corresponding rendered portion of the first version of the frame; and determining whether the rendered portion of the second version of the frame matches the corresponding portion of the first version of the frame based on the results of the comparison.

Another embodiment of the technology described herein comprises a graphics processing system, the graphics processing system comprising:

a graphics processor, the graphics processor comprising a rendering circuit operable to render frames; and a host processor operable to control the graphics processor to render frames;

the host processor comprising a processing circuit configured to cause the graphics processor to, when a frame is to be rendered:

render a first version of a frame in its entirety;

render only a portion but not all of a second version of the frame; the graphics processing system further comprising:

a comparison circuit configured to:

compare a rendered portion of a second version of a frame to a corresponding portion of a rendered first version of the frame; and determine whether the rendered portion of the second version of the frame matches a corresponding portion of the first version of the frame based on the results of the comparison.

In these embodiments of the technology described herein, rather than render two separate entire versions of the frame in question, the graphics processor renders one entire (first) version of the frame, but, when rendering the second version of the frame, renders only a portion (i.e. a part) of that the frame (thereby reducing the rendering cost compared to a system wherein two entire versions of the frame are rendered).

The portion of the second version of the frame that is rendered is then compared to the corresponding portion (e.g., and in an embodiment, having the same position and containing the same data positions) of the first version of the frame, in order to determine whether the two portions of the frame match. (For example, where the portion of the second version of the frame that is rendered corresponds to the upper right quarter of the frame, then, during the comparison process, that upper right quarter of the second version of the frame that is rendered will (in an embodiment) be compared with the corresponding upper right quarter of the first version of the frame that was rendered.)

As will be understood, this then allows the presence of any transient faults that may have caused an error in the rendering of the portion of the initial frame in question to be detected (and thereby, e.g., to trigger an error operation), as if the two portions of the two versions of the frame that have been rendered do not match, it can be assumed that there was a (transient) fault when at least one of the those portions of the frame was rendered.

On the other hand, if the two portions of the two versions of the frame match, it can reasonably be assumed that there was no (transient) fault present when the portions in question of the two versions of the frame were rendered, and so it can reasonably be assumed that the (first version of the) rendered frame is "safe" to, e.g., use, e.g. display, and without the need, e.g., to so frequently refresh that frame (thereby reducing the processing burden on the graphics processor and graphics processing system).

As will be understood by those skilled in the art, these embodiments of the technology described herein may, and in an embodiment do, include any one or more or all of the optional features of the technology described herein discussed herein, as appropriate.

For example, the frame that is rendered may, as discussed herein, comprise a frame (e.g. texture) that is to be used for rendering subsequent frames to be rendered (e.g. in a so-called "render-to-texture" operation). In an embodiment, the frame that is rendered is a frame that is to be displayed (e.g. rather than being used as an input for rendering subsequent frames).

The portion of the frame that is rendered when rendering the second version of the frame may be of any suitable and desired size and shape, and the portion itself may be selected in any suitable and desired manner.

As discussed herein, an (entire) frame will comprise an appropriate array of data positions, with each data position in the frame having an associated set of data values (such as, and in an embodiment, an appropriate set of colour values). The portion of the frame will therefore comprise some (but not all) of (a subset of) the data positions of the array of data positions that would make up an entire frame. The portion of the frame in an embodiment comprises a plurality of data positions that form a continuous area within frame (such as, e.g., a square area, e.g. a 8×8, 16×16 or 32×32 grid of data positions within the array of data positons making up the entire frame).

The graphics processor may (in the manner discussed above) operate to render frames on a region-by-region (e.g. tile-by-tile) basis (wherein an entire frame is divided into a set of regions (e.g. tiles), each region comprising a plurality of data positions). In these embodiments, the portion of the frame that is rendered when rendering the second version of the frame may, and in an embodiment does, correspond to one or more (i.e. a subset) of the regions (e.g. tiles) of the frame that the frame is divided into for rendering purposes (but not, as will be understood, all of the regions that the frame is divided into). (For example, if the frame is divided into 16 separate regions, then the portion of the frame that is to be rendered when rendering the second version of the frame could correspond to a subset, e.g. 4, of those regions that the frame is divided into).

Thus, in embodiments, the graphics processor renders the first version of the frame (in its entirety) by rendering each and every region of a set of regions that the frame is divided into for rendering purposes, but when rendering only a portion of the second version of the frame, the graphics processor renders only a subset of the set of regions that the frame is divided into (wherein that subset of regions makes up the portion of the second version of the frame in question). Then, during the comparison process, at least some (and in one embodiment all of the subset of) region(s) of the portion of the second version of the frame are compared to corresponding (i.e. having the same position and containing the same data positions) region(s) from the corresponding portion of the first version of the frame.

The portion of the frame that is rendered when rendering the second version of the frame could be, and in some embodiments is, a fixed and pre-determined portion of the frame (e.g. corresponding to a certain particular; in an embodiment selected, part of the frame that it is known will be of "critical" importance). For example, the portion of the frame that is to be rendered when rendering the second version of the frame could be (and in some embodiments is) fixed to (always) correspond to (a plurality of data positions within) a central (or other) portion of the frame.

However, in embodiments, the application that requires the graphics processing can, and in an embodiment does, indicate the particular portion of the frame (and corresponding plurality of data positions) that should be rendered when rendering the second version of the frame. This may be done in any suitable and desired manner.

For example, the application that requires the graphics processing may indicate the portion of the frame by providing indicating data to the graphics processor, wherein the indicating data indicates to the graphics processor the portion of the frame that should be rendered when rendering the second version of the frame. This indicating data could, and in one embodiment does, comprise, e.g. data indicating the range of positions making up the portion (area) of the frame that should be rendered (and from which the graphics processor is then able to determine the entire plurality of data positions making up the whole portion in question).

However, in embodiments, wherein the graphics processor operates to render frames on a region-by-region (e.g. tile-by-tile) basis, the indicating data that is provided to the graphics processor comprises an indication, e.g., and in an embodiment, in the form of a bitmap, of the particular (subset of) regions (that the frame is divided into) which make up the portion of the frame that should be rendered (when rendering the second version of the frame). For example, if the frame is divided into 16 separate regions (in a 4×4 grid), and the portion of the frame that is to be rendered corresponds to a subset of (e.g.) 4 of those 16 regions, then the application could provide a 4×4 bitmap to the graphics processor having values of "1" for the four bitmap entries corresponding to the four regions that comprise the portion of the frame that is to be rendered for the second version of the frame (but having values of "0" for the other 12 bitmap entries corresponding to the 12 regions that do not make up the portion of the frame that is to be rendered for the second version of the frame).

Although it would be possible for the graphics processor to store both the first (i.e. entire) and second (i.e. partial) versions of the frame that it generates to memory, in an embodiment only the first version of the frame is stored to memory, as that then saves on memory bandwidth, etc. Thus, in an embodiment the first version of the frame that is (entirely) rendered by the graphics processor is stored to memory for future use (as discussed below), with the second (i.e. partially rendered) version of the frame, while being generated by the graphics processor, not being written out to memory from the graphics processor (but, e.g., simply being discarded once the relevant content indicating information for that version of the frame has been generated).

The comparing of the portion of the second version of the frame to a corresponding portion of the first version of the frame can be carried out in these embodiments of the technology described herein in any suitable and desired manner.

In one embodiment, this is done in one of the manners discussed above. Thus, in one embodiment the comparison process comprises comparing a set of information representative of the content of the portion of the second version of the frame (that is generated when rendering the second version of the frame) to a set of information representative of the content of the corresponding portion of the first version of the frame (that is generated when rendering the first version of the frame) (e.g. in the manner described above), wherein the information representative of the content of the corresponding portions of the versions of the frames can be any suitable information and desired information that is representative of the content of the corresponding portions of the versions of the frame (as discussed above).

In this case, the information representative of the content of the portion of the version of the frame is in an embodiment in the form of one or more "signatures" for the portion of the version of the frame, which signature(s) are generated from (based on) the content of the portion of the version of the frame (e.g. in the manner as described above).

In some embodiments, wherein the graphics processor operates to render frames on a region-by-region basis (e.g. in the manner as described above), sets of information (e.g. content-indicating signatures) for respective regions of the frame (that are representative of the content of the region) may be generated (as described above) when rendering respective regions of the frame (both when rendering the entirety of the first version of the frame, and when rendering only a portion of the second version of the frame), with these sets of information (e.g. content-indicating signatures) for corresponding regions of the first and second versions of the frame then being subsequently compared to determine whether or not those respective regions of the first and second versions of the frames match. This comparison process may be carried out by the host processor or the graphics processor (as discussed above).

However, the Applicants have also recognised that, since only a portion of the frame is being re-rendered and compared, it would be possible to perform a more rigorous comparison of the corresponding portions of the first (i.e. entirely) and second (i.e. partially) rendered versions of the frame, at least in certain cases, e.g. wherein only a small portion (corresponding to a single or a small number of regions) of the frame is to be re-rendered, whilst still achieving an overall reduction in power and processing resources compared to a system which compares an entire (fully rendered) frame to another subsequently rendered entire (fully rendered) frame (however that is done).

Thus, in another embodiment, the respective portions of the first and second versions of the frame are compared on a data position-by-data position basis (i.e. with a (and in an embodiment each) data position (and associated set of data values) of the rendered portion of the second version of the frame being compared to a (and in an embodiment each) corresponding data position (and associated set of data values) of the corresponding rendered portion of the first version of the frame). In this embodiment, the comparison (and match determination) process may be carried out by the host processor, or the graphics processor, or by the application that requires the graphics processing.

The determination as to whether the rendered portion of the second version of the frame matches the corresponding portion of the first version of the frame can be carried out in these embodiments of the technology described herein in any suitable and desired manner.

In embodiments wherein respective portions of the first and second versions of the frame are compared on a data position-by-data position basis, the system in an embodiment operates to require an exact match of the data values for the data positions of the portion of the second version of the frame to the corresponding data values for the corresponding data positions of the portion of the first version of the frame, for it to correspondingly be determined that the rendered portion of the second version of the frame matches the corresponding portion of the first version of the frame.

However, it would also be possible, in these embodiments, to instead only require that corresponding data values for corresponding data positions are sufficiently similar to each other, for there to be a determination that the rendered portion of the second version of the frame matches the corresponding portion of the first version of the frame, e.g. to allow some slight variation in colour between the two versions of the frame.

Additionally or alternatively, in the case where data position-by-data position comparisons are carried out for a plurality of data positions, in embodiments it is only determined that the rendered portion of the second version of the frame matches the corresponding portion of the first version of the frame if the data values for all of the corresponding pairs of data positions (that are being compared) match each other.

However, it would also be possible to allow, for example, in an embodiment a threshold number of data values to not match, but for it still to be determined that the rendered portion of the second version of the frame (sufficiently) matches the corresponding portion of the first version of the frame.

Similarly, in embodiments wherein the comparison process (instead) comprises comparing a set of information representative of the content of the portion of the second version of the frame to a set of information representative of the content of the corresponding portion of the first version of the frame, the comparison may require an exact match of that information for it to correspondingly be determined that the rendered portion of the second version of the frame matches the corresponding portion of the first version of the frame, or it may require only that the information representative of the content, e.g. signatures, are sufficiently similar to each other.

Additionally or alternatively, in these embodiments, in the case where a plurality of, e.g., signature, comparisons on a region-by-region basis are performed, it is in an embodiment only determined that the rendered portion of the second version of the frame matches the corresponding portion of the first version of the frame if the respective comparisons for the individual regions indicate that all of the respective regions match each other (or at least are sufficiently similar to each other). However, it would also be possible to allow, for example, particular, in an embodiment selected, in an embodiment predetermined, parts (areas) of the two versions of the initial frame to not match based on the signature comparisons, but for it still to be determined that the rendered portion of the second version of the frame matches the corresponding portion of the first version of the frame.

In these embodiments of the technology described herein, in the event that it is determined that the portion of the second version of the frame matches the corresponding portion of the first version of the frame, then it can be, and in an embodiment is, correspondingly determined that the rendered first version of the frame can (safely) be used.

Thus, in embodiments wherein the frame that is rendered comprises a frame (e.g. texture) that is to be used for rendering subsequent frames to be rendered, when it is determined that the portion of the second version of the frame matches the corresponding portion of the first version of the frame, then it can be correspondingly determined that the rendered first version of the frame can (safely) be used, e.g. by the graphics processor, for (and when) rendering subsequent frames, and thus the graphic processor in an embodiment renders one or more subsequent frames using the first (i.e. entirely rendered) version of the frame (e.g. in the manner described above).

Similarly, in embodiments wherein the frame that is being rendered is (e.g. instead) a frame to be displayed, when it is determined that the portion of the second version of the frame matches the corresponding portion of the first version of the frame, then it can be correspondingly determined that the rendered first version of the frame can (safely) be displayed, and thus the first version of the frame is in an embodiment outputted by the graphics processor to a display (e.g. screen).

On the other hand, when it is determined from the comparison that the respective portions of the first and second versions of the frames do not (sufficiently) match, then it can be, and is in an embodiment, determined that the first version of the frame should not be used.

Thus, in embodiments wherein the frame that is rendered comprises a frame (e.g. texture) that is to be used for rendering subsequent frames to be rendered, when it is determined from the comparison that the respective portions of the first and second versions of the frames do not (sufficiently) match, then it can be, and is in an embodiment, determined that the first version of the frame should not be used, e.g. for rendering subsequent frames by the graphics processor (as it can be determined that an error or fault occurred when rendering one or both of the first and second versions of the frame). In this case, the graphics processing system in an embodiment then proceeds instead to perform some form of, particular, in an embodiment selected, in an embodiment predefined, "error" operation (e.g. in the manner described above).

Similarly, in embodiments wherein the frame that is being rendered is (e.g. instead) a frame that is to be displayed, when it is determined from the comparison that the respective portions of the first and second versions of the frames do not (sufficiently) match, then it can be, and is in an embodiment, determined that the first version of the frame should not be used, and thus the first version of the frame is not outputted to a display (e.g. screen), and the graphics processing system instead in an embodiment proceeds, similarly, to perform some form of, particular, in an embodiment selected, in an embodiment predefined, "error" operation (e.g. in the manner described above).

Other arrangements would, of course, be possible.

The Applicants have recognised that the operation in the manner of the technology described herein is particularly applicable to the detection (and thus avoidance) of transient faults when rendering the frame in question.

Accordingly, in an embodiment, the graphics processor and system is also operable to and configured to (and operates to) detect the presence of "persistent" faults in its operation. This can be done in any suitable and desired manner, such as, and in an embodiment, by the use of appropriate built-in self-testing (BIST) mechanisms and circuits. Other arrangements would, of course, be possible.

Subject to the requirements for operation in the manner of the technology described herein, the graphics processor can otherwise include any or all suitable and desired circuits, elements and units that a graphics processor may comprise. Thus the rendering circuit may comprise, for example, a rasterisation circuit (a rasteriser) followed by an appropriate fragment rendering circuit (renderer), such as a fragment shader (a fragment shading circuit). Correspondingly, the graphics processor and rendering circuit may comprise appropriate depth and stencil test circuits, blending circuits, primitive setup circuits, a tiler (a tiling circuit), etc.

Correspondingly, the host processor can be any suitable and desired host processor of a graphics processing system. The host processor can, and in an embodiment does, execute applications that may require graphics processing by the graphics processor, and includes and executes an appropriate driver (e.g. including a compiler) for the graphics processor, such that it can prepare commands, instructions, data structures, etc., for execution and use by the graphics processor to perform desired graphics processing operations in response to requests for graphics processing operations from applications that are executing on the host processor.

In an embodiment, the operation in the manner of the technology described herein can be selectively activated for a given output to be generated by the graphics processor. This would then allow this operation to be used where desired (e.g. in the case of use in a safety critical environment when rendering an output that may be subject to transient faults and would not otherwise be protected from such faults), but avoid its use in those circumstances where it is not required.

Thus, in an embodiment, the driver for the graphics processor is operable to be able to configure the graphics processor selectively to operate in the manner of the technology described herein, e.g., and in an embodiment, on an output-by-output basis.

The, e.g. driver, can recognise when operation in the manner of the technology described herein is required in any suitable and desired manner. For example, and in an embodiment, an application that requires graphics processing by the graphics processor could be configured to and operable to be able to indicate when processing in the manner of the technology described herein is required. This could be achieved, for example, and in an embodiment, by providing an appropriate API extension, whereby an application programmer can indicate that operation in the manner of the technology described herein is desired.

Other arrangements would, of course, be possible.

As well as the graphics processor and the host processor, the graphics processing system can otherwise include any other suitable and desired elements and components that a graphics processing system may include. Thus it in an embodiment comprises at least a display for displaying the frames (images) generated by the graphics processor. There may also be a corresponding display controller for providing frames rendered by the graphics processor to the display. The graphics processing system may also, e.g., include a camera or cameras and a corresponding image signal processor, and/or a video processor, for capturing images of an environment (e.g. of the environment surrounding a vehicle, or being viewed by a medical device, such as an endoscope), and then providing those images for, e.g., processing by the graphics processor for display.

Other arrangements would, of course, be possible.

The graphics processing system and graphics processor in an embodiment comprises, and/or is in communication with, one or more memories and/or memory devices that store the data described herein, and/or store software for performing the processes described herein.

The technology described herein can be used for all forms of output that a graphics processor (and processing pipeline) may be used to generate. The output data values from the processing are in an embodiment exported to external, e.g. main, memory, for storage and use, such as to a frame buffer for a display.

The technology described herein is applicable to any suitable form or configuration of graphics processor and graphics processing system. In an embodiment, the various functions of the technology described herein are carried out on a single data processing platform that generates and outputs data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and graphics processor can otherwise include any one or more or all of the usual functional units, etc., that data processing systems and graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

FIG. 1 shows an exemplary graphics processing system 100 that can be operated in accordance with the embodiments of the technology described herein.

As shown in FIG. 1, the graphics processing system 100 includes a central processing unit (CPU) 102, a graphics processor (graphics processing unit) (GPU) 101, an image signal processor (ISP) 106 (coupled to a camera 107), and a display controller 103, that communicate via an interconnect 104. The CPU, GPU, ISP and display controller also have access to off-chip memory 130 for storing, inter alia, frames to be displayed, via a memory controller 105.

In the present embodiment, the GPU 101 is a tile based graphics processor that produces tiles of an output data array, such as an output frame, to be generated. The output data array may be an output frame intended for display on a display device, such as a screen or printer, but may also, for example, comprise a "render to texture" output of the graphics processor, etc.

The GPU 101 will, for example, generate a sequence of frames for display, which are stored via the memory controller 105 in a frame buffer in the off-chip memory 130.

Then, when the frames are to be displayed, the display controller 103 will read the frames from the frame buffer in the off-chip memory 130 via the memory controller 105 and send them to a display 120 for display.

The present embodiments relate in particular to the operation of a graphics processing system such as that shown in FIG. 1 where the graphics processor 101 is being used to render frames for display for a safety-critical application (in a safety-critical environment). Such applications may be where the graphics processing system shown in FIG. 1 is being used to render images for display in a vehicle, such as for a vehicle cockpit display or as an automotive mirror replacement system. Other safety-critical applications that a graphics processing system may be used to render frames for display for include, for example, for use in medical applications, such as when rendering images for display from medical devices, such as endoscopes.

The present embodiments are concerned in particular with the case where the graphics processor 101 is used to render an initial frame that will then be used as a texture for rendering subsequent frames that are displayed.

Figure 2:
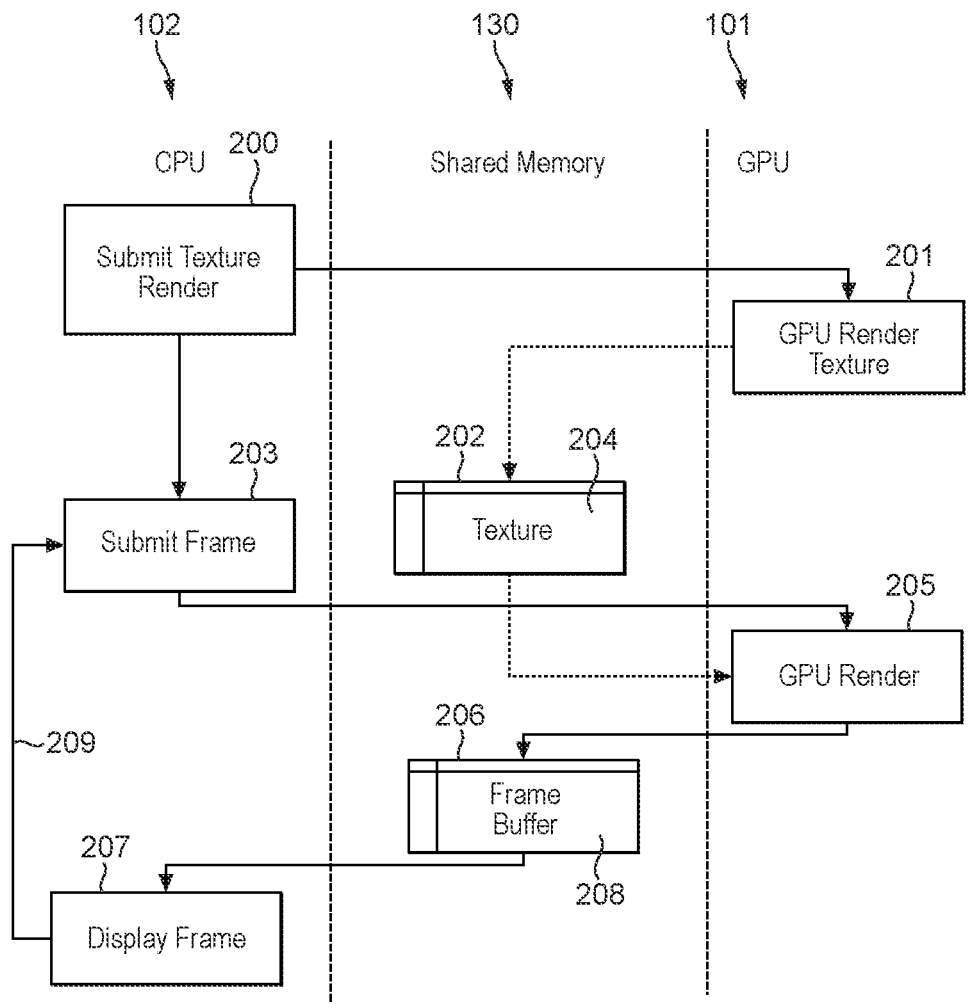
FIG. 2 shows schematically the operation of a graphics processing system in embodiments of the technology described herein.

FIG. 2 illustrates this operation, and shows the host processor 102 instructing the graphics processor to render a texture (a frame that will be used as a texture when rendering future frames) (step 200), with the graphics processor then rendering the texture (step 201) and storing the rendered texture 204 in the shared memory (step 202).

The host processor 102 will then instruct the graphics processor to render a subsequent frame (step 203), using the texture 204 that has been stored in the memory. The graphics processor will then render a subsequent frame using the texture 204 (step 205), and store the rendered frame 208 in a frame buffer in the memory 130 (step 206) from where it may then be read, as discussed above, by the display controller 103 and displayed, e.g. to the user (step 207).

The host processor 102 will then, e.g., repeat (step 209) the process of instructing the graphics processor to render a subsequent frame using the texture 204 that has been stored in the memory for display (steps 203, 205, 206 and 207), which operation will, e.g., be repeated such that a sequence of plural subsequent frames will be displayed, each being generated using the texture 204 as an input to the rendering process.

This will be continued e.g., until the display in question is no longer required (or otherwise changes such that, for example, a new texture for use needs to be rendered).

The Applicants have recognised that an issue with the operation shown in FIG. 2 is that the texture 204 that is initially rendered by the graphics processor will be used, potentially many times, when rendering the subsequent frames that are displayed. Thus if there is a fault in that initially rendered texture 204, that fault will persist, potentially for a significant period of time, and appear in the subsequent frames that are displayed. This may be undesirable, and, indeed, potentially dangerous, in the case where the graphics processor and graphics processing system is being used to render frames for display in a safety-critical environment (as discussed above).

To address this, in the present embodiments, and in accordance with the technology described herein, the graphics processor is controlled to generate two versions of the initial texture 204, together with a set of content-indicating signatures for respective regions of the versions of the texture, with the content-indicating signatures then being compared to determine whether the two versions of the texture (frame) that the graphics processor has rendered match or not.

Then, if the two versions of the texture (frame) are determined to match, it is assumed that there were no errors present when rendering the versions of the texture (frame), such that the texture (frame) can safely be used as a texture when rendering subsequent frames for display.

On the other hand, if the comparison of the content-indicating signatures indicates that the two versions of the texture (frame) that the graphics processor rendered do not match, then it is assumed that there was an error when rendering the texture, and so the texture is not used for rendering subsequent frames, but instead an appropriate error operation is performed (as will be discussed further below).

Figure 3:
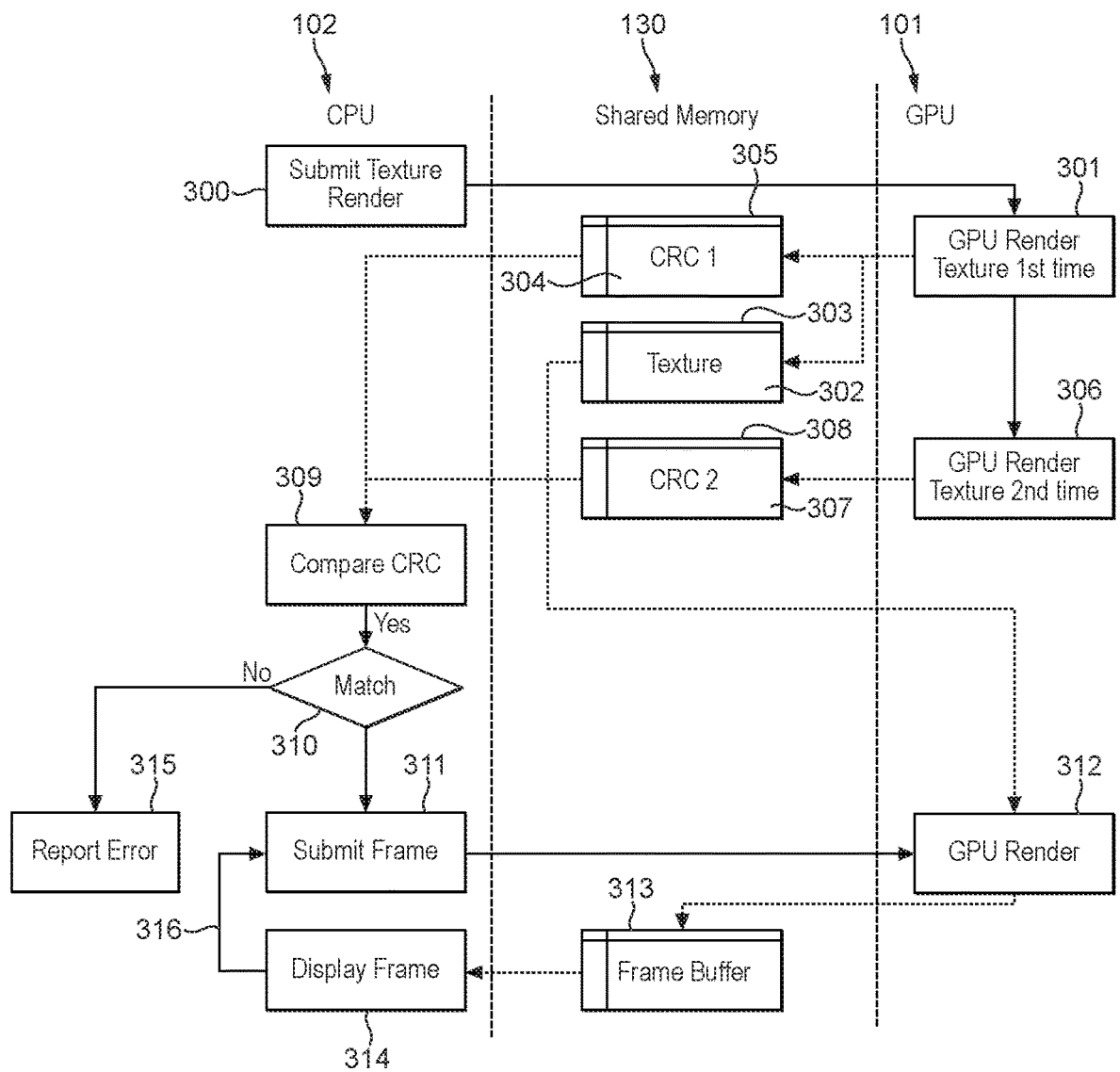
FIG. 3 shows in more detail the operation of a graphics processing system in an embodiment of the technology described herein.
Figure 4:
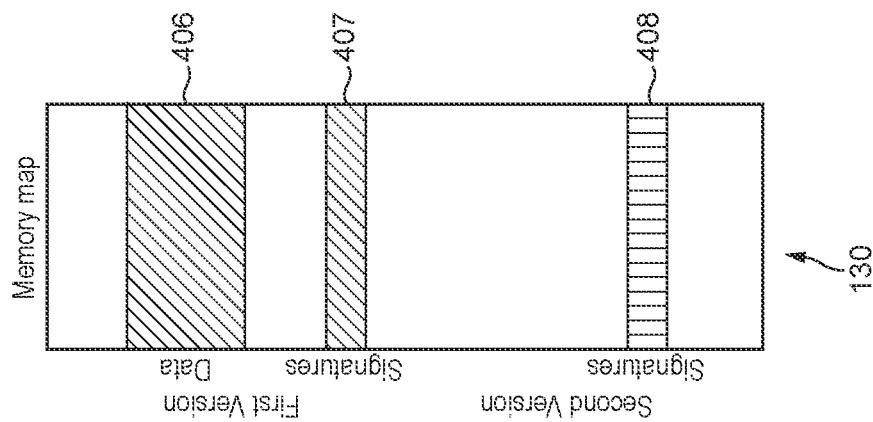
FIG. 4 illustrates the generation of two versions of a frame in the embodiment of FIG. 3.
Figure 4:
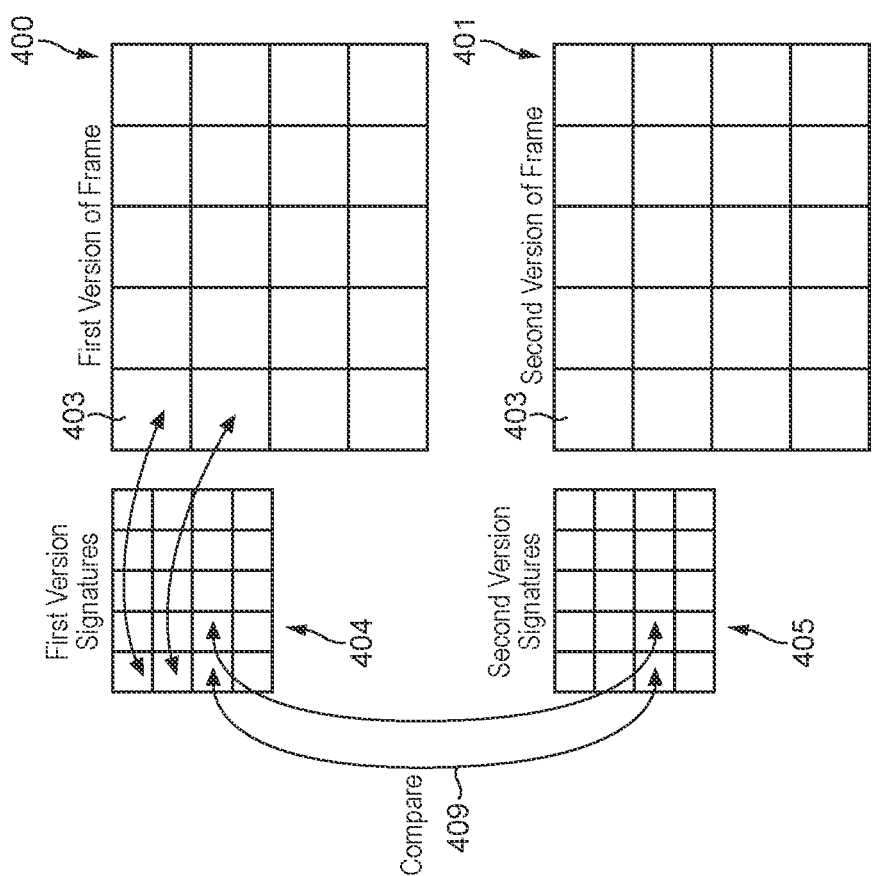
Figure 5:
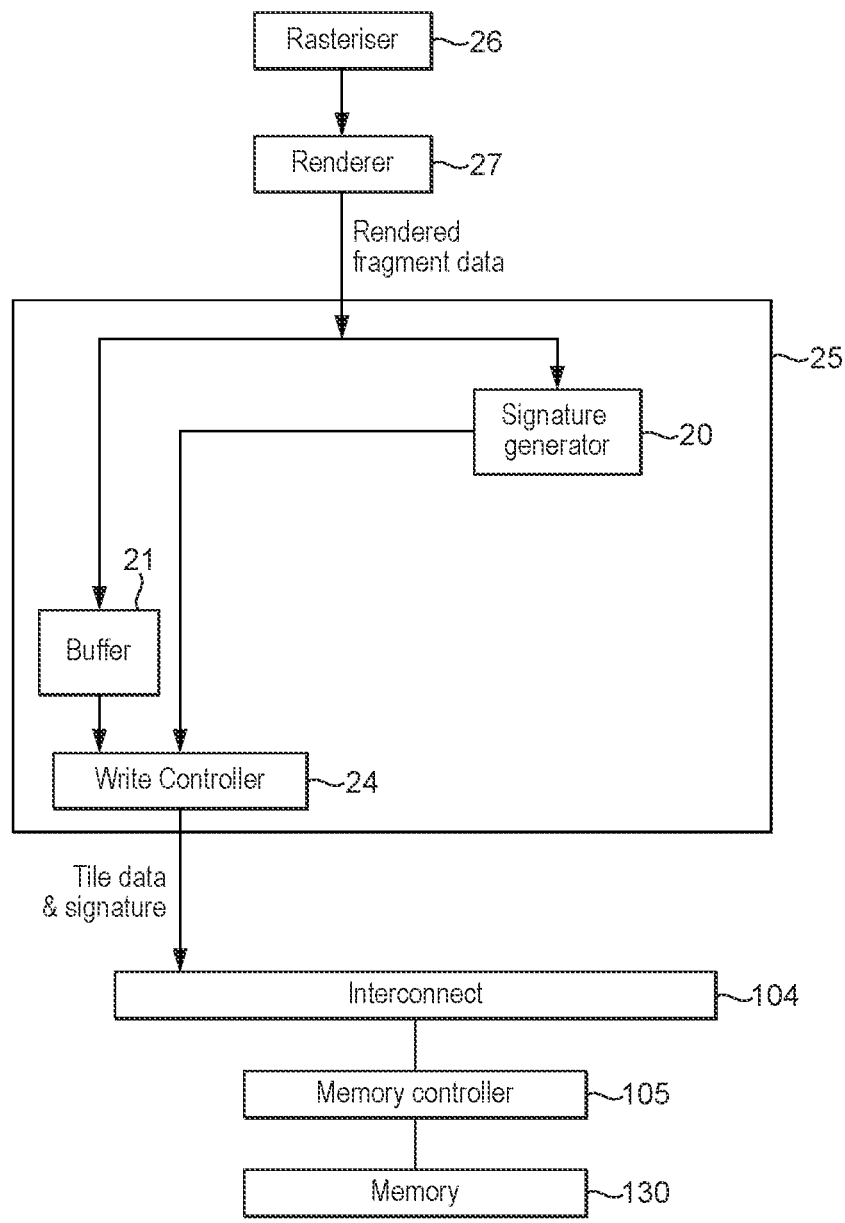
FIG. 5 shows schematically details of the operation of the graphics processor in the embodiment shown in FIG. 3.
Figure 6:
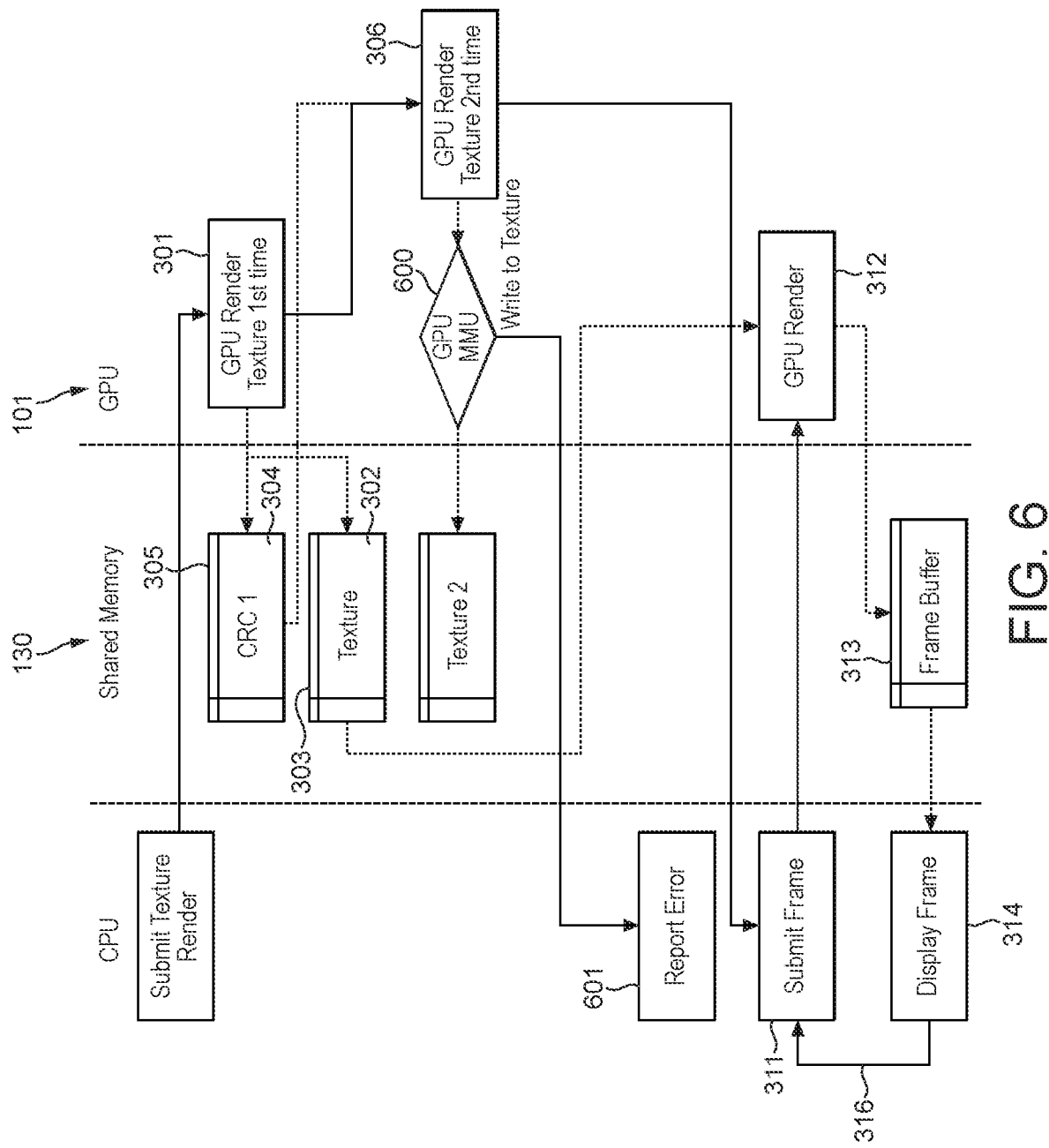
FIG. 6 shows in more detail the operation of a graphics processing system in another embodiment of the technology described herein.
Figure 7:
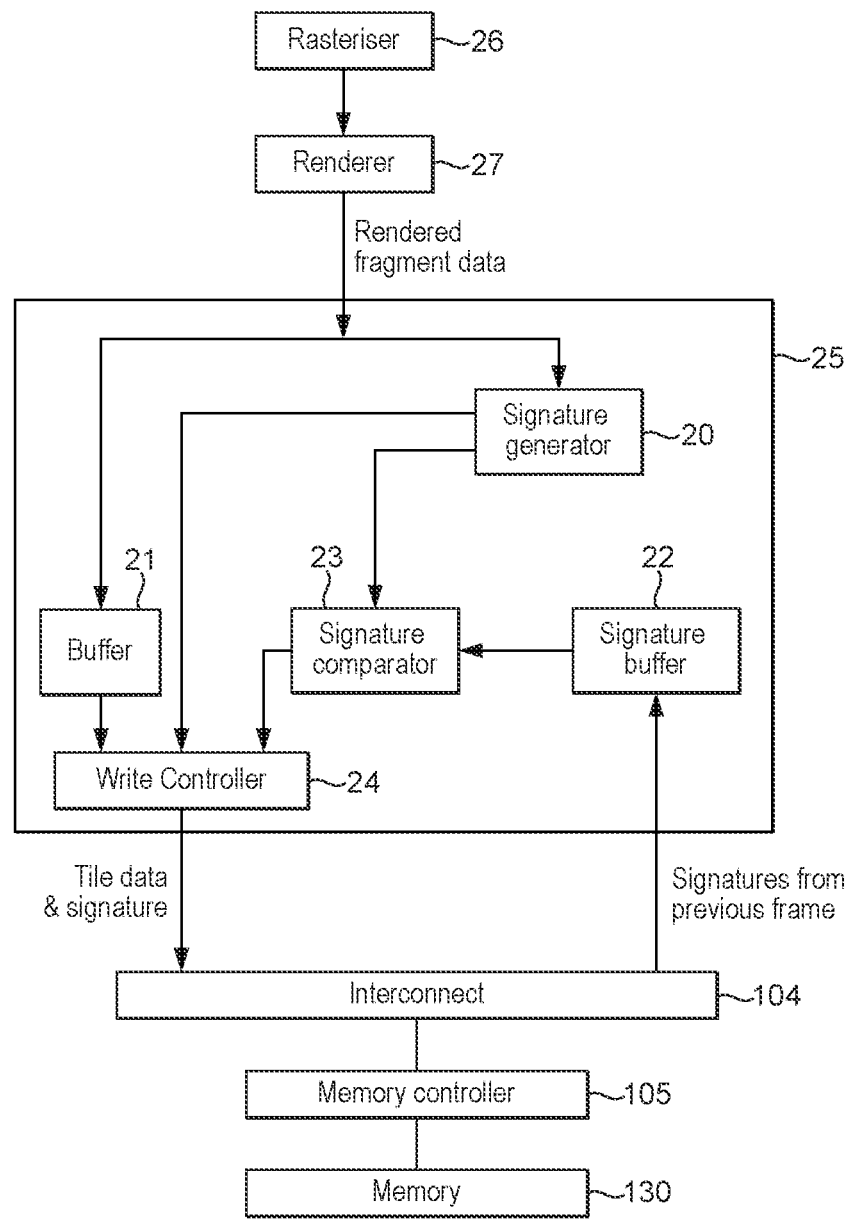
FIG. 7 shows schematically details of the operation of the graphics processor in the embodiment shown in FIG. 6.

A first embodiment of this operation is shown in FIGS. 3, 4 and 5, and a second embodiment of this operation is shown in FIGS. 6 and 7.

In the embodiment shown in FIGS. 3, 4 and 5, the graphics processor renders the two versions of the texture 204 and at the same time generates a set of content-indicating signatures for each version of the rendered texture, but then the signature comparisons and the determination of whether the two versions of the rendered texture match or not, are performed on and by the host processor 102.

Thus, as shown in FIG. 3, the process starts with the host processor instructing the graphics processor to render two versions of a texture frame for use as a texture when rendering subsequent frames for display (step 300).

In response to this, the graphics processor renders a first version of the texture frame (step 301) and at the same time generates a set of content-indicating signatures (in this case in the form of CRCs) for that version of the texture frame (this operation will be discussed in more detail below).

The graphics processor stores the first version 302 of the texture frame, and the generated set of content-indicating signatures 304 for that version of the texture frame, to memory (steps 303 and 305).

The graphics processor then renders a second version of the texture frame (step 306) and, again, at the same time, generates a set of content-indicating signatures 307 for that rendered version of the texture frame.

In this case though, and as shown in FIG. 3, the graphics processor only stores the set of content-indicating signatures 307 in the memory (step 308). It does not store the second rendered version of the texture frame in the memory. (This may be achieved by disabling the write out of the rendered texture frame when generating the second version of that frame.)

In the present embodiments, the graphics processor is re-set, such that all of the relevant caches are cleared, in between rendering the first and second versions of the texture frame. This should then avoid any data, etc., from rendering the first version of the texture frame from being carried over to the rendering of the second version of the texture frame.

Once the graphics processor has rendered both versions of the texture frame, and stored one version 302 of that frame, together with the appropriate two sets 304, 307 of content-indicating signatures, in the memory 130, the host processor 102 then reads and compares the sets of content-indicating signatures (CRCs) generated for the first and second versions of the texture frame (step 309) and determines, on the basis of the signature comparison, whether the first and second versions of the texture frame matched or not (step 310).

In the present embodiments, the graphics processor 101, as it is a tile-based graphics processor, generates a respective content-indicating signature (in the form of a CRC) for each tile of the respective version of the texture that it generates. Thus, for each version of the texture, a set of content-indicating signatures, one for each tile (region) of the version of the texture that the graphics processor generated, will be generated and stored.

FIG. 4 illustrates this, and shows the respective first 400 and second 401 versions of the texture divided into the respective tiles 403 that the graphics processor 101 generates when generating the versions of the texture, and the associated sets 404, 405 of content-indicating signatures for the tiles for each version of the texture.

FIG. 4 also illustrates the storing of the data 406 for the first version of the texture, together with its associated set of signatures 407, and the storing of the signatures 408 only for the second version of the texture in the memory 130.

The host processor in this embodiment thus compares the signatures on a tile-by-tile (region-by-region) basis 409 (FIG. 4), i.e. such that the signature for a given tile in the first version of the texture is compared to the signature for the corresponding tile in the second version of the texture. This is repeated for each tile that was generated for the versions of the textures.

In the present embodiment, the signature comparisons determine whether the signatures match exactly or not. (Other arrangements, such as having some permitted mismatch threshold would also be possible, if desired.)

If the signature comparisons indicate that all the signatures being compared match, then in the present embodiment the host processor correspondingly determines that the first and second rendered versions of the texture frame match.

On the other hand, if any one or more of the signatures do not match when compared (i.e. there is at least one tile (region) of the first and second versions of the texture frame for which the signatures did not match), then the host processor determines that the first and second versions of the texture frame did not match.

When it is determined from the signature comparisons that the first and second rendered versions of the texture frame matched, then the host processor 102 determines that the rendered texture frame 302 stored in the memory can be used as a texture for rendering subsequent frames for display, and so will correspondingly instruct the graphics processor to render a further frame using that texture frame (step 311) (FIG. 3), with the graphics processor 101 then correspondingly rendering the subsequent frame using the texture 302 (step 312), and storing the rendered subsequent frame in the memory (step 313), from where it can then be read for display (step 314).

Again, the process of the host processor submitting a frame to be rendered using the texture 302 and that frame being displayed will be repeated as desired (step 316), so as to, e.g., display a sequence of frames that use the texture 302.

On the other hand, when it is determined from the signature comparisons that the first and second versions of the texture frame did not match, then the host processor 102 performs an appropriate error operation (step 315).

The error operation that is performed when it is determined that the first and second versions of the texture rendered by the graphics processor do match can be any suitable and desired error operation to be performed in that event. For example, the host processor comparison and determination process could report the error to the driver for the graphics processor and/or to the application that is requesting the graphics processing, with the driver and/or application then triggering an appropriate error operation to be performed.

The error operation that is performed in the event that it is determined that the first and second versions of the texture do not match could be, for example, for the graphics processor to try to render the texture again in the manner of the present embodiments, e.g. until the texture is successfully rendered, or a maximum number of permitted "re-tries" has been reached.

Additionally or alternatively, the operation could revert to the graphics processor using a different, predefined, and e.g. pre-stored texture, that is known to be "safe" for rendering the subsequent frames, and/or the graphics processor rendering an appropriate error message to be displayed to the user. This could be done immediately the texture is failed to be rendered safely, or after a predetermined number of re-attempts to render the texture have been made.

Other error operations would, of course, be possible.

FIG. 5 shows aspects of the operation of the graphics processor 101 when rendering the versions of the texture frame in this embodiment in more detail, and in particular the generation of the content-indicating signatures for the versions of the texture frame that it renders.

As shown in FIG. 5, the GPU 101 will rasterize graphics primitives to generate fragments to be rendered in a rasteriser (rasterization circuit) 26. The graphics fragments will then be rendered in a renderer (rendering circuit) 27 to produce rendered fragment data for respective sampling positions within the tile that the GPU 101 is currently producing. The rendered fragment data is stored in a tile buffer 21 while the tile is being rendered.

(Although FIG. 2 only shows the rasteriser 26 and renderer 27 of the GPU 101 for simplicity, it will be appreciated that the graphics processing pipeline executed by the GPU 101 may include any other suitable and desired stages of a graphics processing pipeline that may be used to generate rendered fragment data as desired.)

As shown in FIG. 5, as well as the rendered fragment data generated by the graphics processor 101 being stored in the tile buffer 21, that data is also passed in parallel to a signature generator 20 that operates to generate a content-indicating signature for the tile that is being rendered.

In the present embodiments, the content-indicating signatures are calculated using a CRC (cyclic redundancy check) function.

Other signature generation functions, such as a hash function, and other forms of signature, could also or instead be used, if desired. It would also, for example, be possible to generate a single signature for an RGBA tile, or a separate signature for each colour plane. Similarly, colour conversion could be performed and a separate signature generated for each of Y, U and V.

Once the tile has been completely rendered into the tile buffer 21 (i.e. the rendering of the tile has been completed), and the corresponding signature (CRC) has been generated, a write controller 24 operates to write the tile (region) and signature to the memory 130 (as discussed above).

FIGS. 6 and 7 show a second embodiment of the operation of the graphics processing system and graphics processor when rendering a texture that is to be used for rendering subsequent frames in a safety-critical context.

In this case, the operation is similar to the embodiment shown in FIGS. 3, 4 and 5, but the comparison of the content-indicating signatures for the respective regions of the version of the texture is performed by the graphics processor as it generates the tiles for the second version of the texture (rather than the comparison and match determination being performed by the host processor as in the embodiment shown in FIGS. 3, 4 and 5). This embodiment accordingly avoids the need to write the signatures for the second version of the texture to memory, and the performing of the comparison and match determination on the host processor.

FIG. 6 shows the operation of the graphics processing system in this embodiment. FIG. 7 shows the corresponding operation and circuits of the graphics processor 101 in more detail.

As shown in FIG. 6, in this embodiment, the process again starts with the host processor 102 instructing the graphics processor to render two versions of a frame to be used as a texture when rendering subsequent frames for display (step 300).

In response to this, the graphics processor similarly renders a first version of the texture frame (step 301) and at the same time generates a set of content-indicating signatures for the tiles for that version of the texture frame that it generates, and stores the first version 302 of the texture frame and the corresponding set of content-indicating signatures 304 in the memory 130 (steps 303 and 305).

The graphics processor will then operate to render the second version of the texture frame, again on a tile-by-tile basis (as a sequence of rendered tiles) (step 306), and for each tile that it generates it will generate a corresponding content-indicating signature (CRC).

However, in this case, and as will be discussed in more detail in relation to FIG. 7 below, when the graphics processor 102 has generated a tile and its corresponding content-indicating signature for the second version of the texture frame, it then itself performs a comparison of the signature for the tile (region) in the second version of the texture with the signature that was generated for the corresponding tile (region) in the first version of the texture.

As will be discussed further below in relation to FIG. 7, in this embodiment the graphics processor 101 is further configured such that if the two signatures are determined to match, then it does not attempt to write the rendered tile for the second version of the texture to memory, but if the signatures are determined not to match, then the graphics processor will attempt to write the rendered tile (region) for the second version of the texture to memory.

However, in this embodiment, any such attempt to write a tile for the second version of the texture to the memory is intercepted by an appropriate memory management unit of the graphics processor 101 (step 600), which memory management unit in response to such an attempt to write a rendered tile for the second version of the texture to memory, instead blocks (disables) that write operation to the memory (such that the tile is not written to the memory), and instead signals an error situation to the host processor (step 601)).

The effect of this then is that where the graphics processor determines that the rendered tile for the second version of the texture does not match the corresponding rendered tile in the first version of the texture according to the signature comparisons, thereby triggering an attempt to write the rendered tile for the second version of the texture to the memory, that is identified and taken as an indication that the second version of the texture does not match the first version of the texture, and so an error situation (error operation) is triggered.

As shown in FIG. 6, this is in an embodiment done by the memory management unit for the graphics processor intercepting the attempt to write to memory for the second version of the texture, and blocking (discarding) that write operation, but correspondingly signaling an appropriate error to the host processor.

In response to the signaling of the error event, the host processor can proceed to trigger the appropriate error operation (as discussed above).

As shown in FIG. 6, in this embodiment, in the case where all of the signature comparisons match (such that the second version of the texture matches the first version of the texture according to the signature comparisons), then again that is signaled to the host processor, with the host processor then proceeding to cause the graphics processor to render further frames for display using the texture (steps 311, 312, 313, 314 and 316).

FIG. 7 shows aspects of the operation of the graphics processor 101 when rendering the versions of the texture frame in this embodiment in more detail.

As shown in FIG. 7, the GPU 101 will again rasterize graphics primitives to generate fragments to be rendered in a rasteriser (rasterization circuit) 26. The graphics fragments will then be rendered in a renderer (rendering circuit) 27 to produce rendered fragment data for respective sampling positions within the tile that the GPU 101 is currently producing. The rendered fragment data is stored in a tile buffer 21 while the tile is being rendered.

As shown in FIG. 7, as well as the rendered fragment data generated by the graphics processor 101 being stored in the tile buffer 21, that data is again also passed in parallel to a signature generator 20 that operates to generate a content-indicating signature for the tile that is being rendered.

However, in this case, the graphic processor 101 also includes a signature comparison circuit 23 that is operable to compare the signature for a new tile with the content-indicating signature of a previously generated tile that has already been written to the off-chip memory 130, to determine if the new tile is similar to a previous tile, and to control the write controller 24 to either write the new tile to the memory or not, on the basis of the comparison (and in particular to not write the new tile to memory if the signatures are determined to match (but to write the new tile to the memory if the signatures do not match)).

In this way, a tile is only written to the frame buffer in the memory 130 if it is found by the signature comparison to differ from the corresponding tile that is already stored in the memory 130. This helps to reduce the number of write transactions to the memory 130 as a frame is being generated.

The signature generator 20 and signature comparator 23 thus accordingly act as a write transaction elimination circuit, that can be used to avoid unnecessary writes of identical tiles to the memory.

In this embodiment, once a tile for the second version of the texture frame has been completely rendered into the tile buffer 21 (i.e. the rendering of the tile has been completed), the content-indicating signature for that tile that has been generated by the signature generator 20 is passed to the signature comparator 23, which operates to compare the signature for the tile for the second version of the texture with the signature for the corresponding tile from the first version of the texture (that is already present in the frame buffer in the external memory 130).

If the signatures do not match, then the signature comparator 23 controls the write controller 24 to (attempt to) write the tile for the second version of the texture to the memory 130 (which write attempt is then prevented by the MMU and an error signaled, as discussed above).

(On the other hand, if the signature comparator 23 finds that the signature of the tile for the second version of the frame matches the signature of the corresponding tile in the first version of the frame, then the write controller 24 invalidates the tile and no data is written to the memory.)

As shown in FIG. 7, the signatures for plural tiles from the first version of the texture may be cached in a signature buffer 22 (this buffer may be implemented in a number of ways, e.g. as a buffer or cache) of the signature generation and comparison hardware unit (circuit) 25 to facilitate their retrieval in operation of the system, and so the signature comparator 23 fetches the relevant signature from the signature buffer 22 if it is present there (or triggers a fetch of the signature from the main memory 130), and compares the signature of the tile from the first version of the texture with the signature received from the signature generator 20 to see if there is a match.

Figure 8:
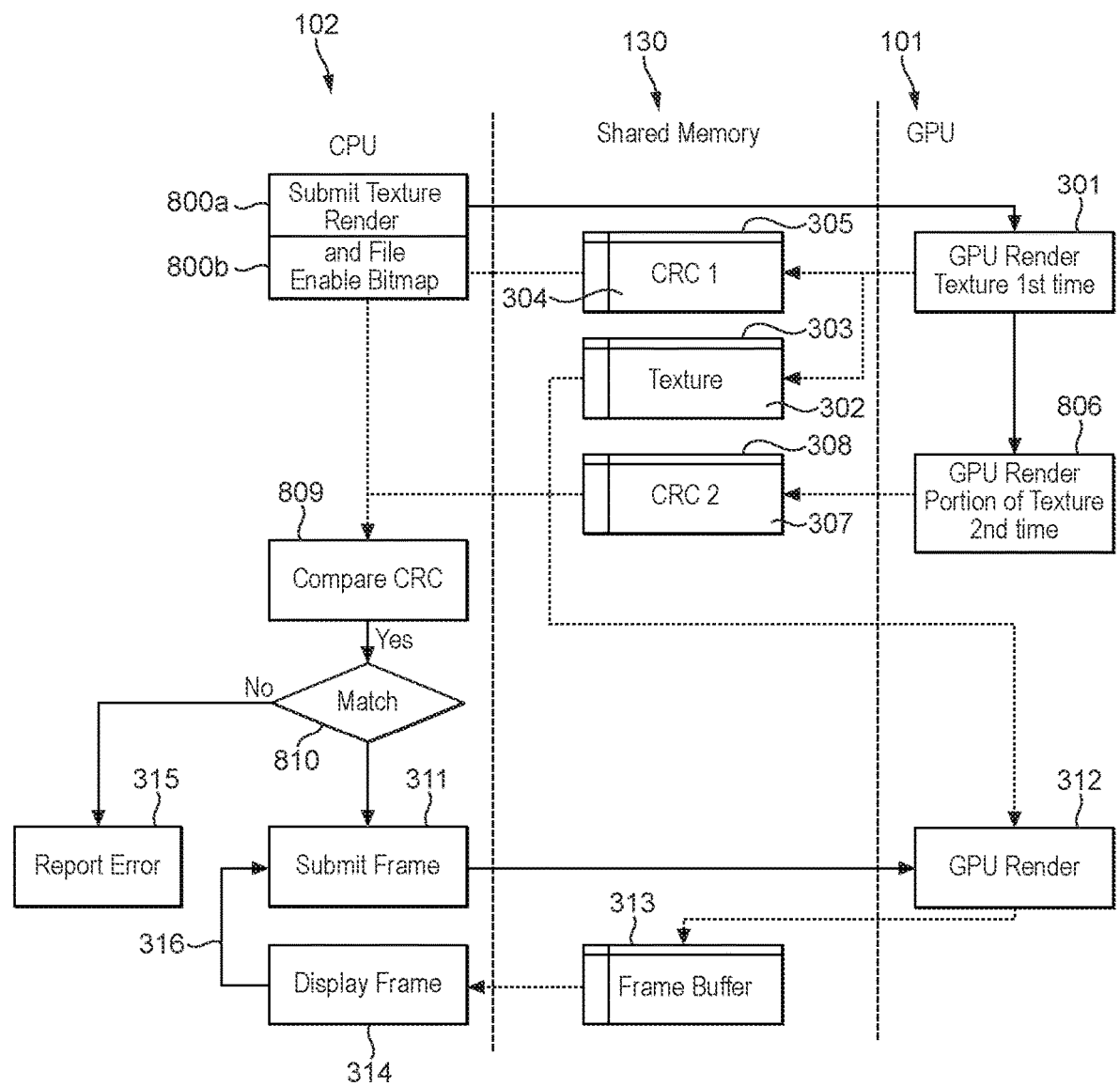
FIG. 8 shows in more detail the operation of a graphics processing system in an embodiment of the technology described herein.
Figure 9:
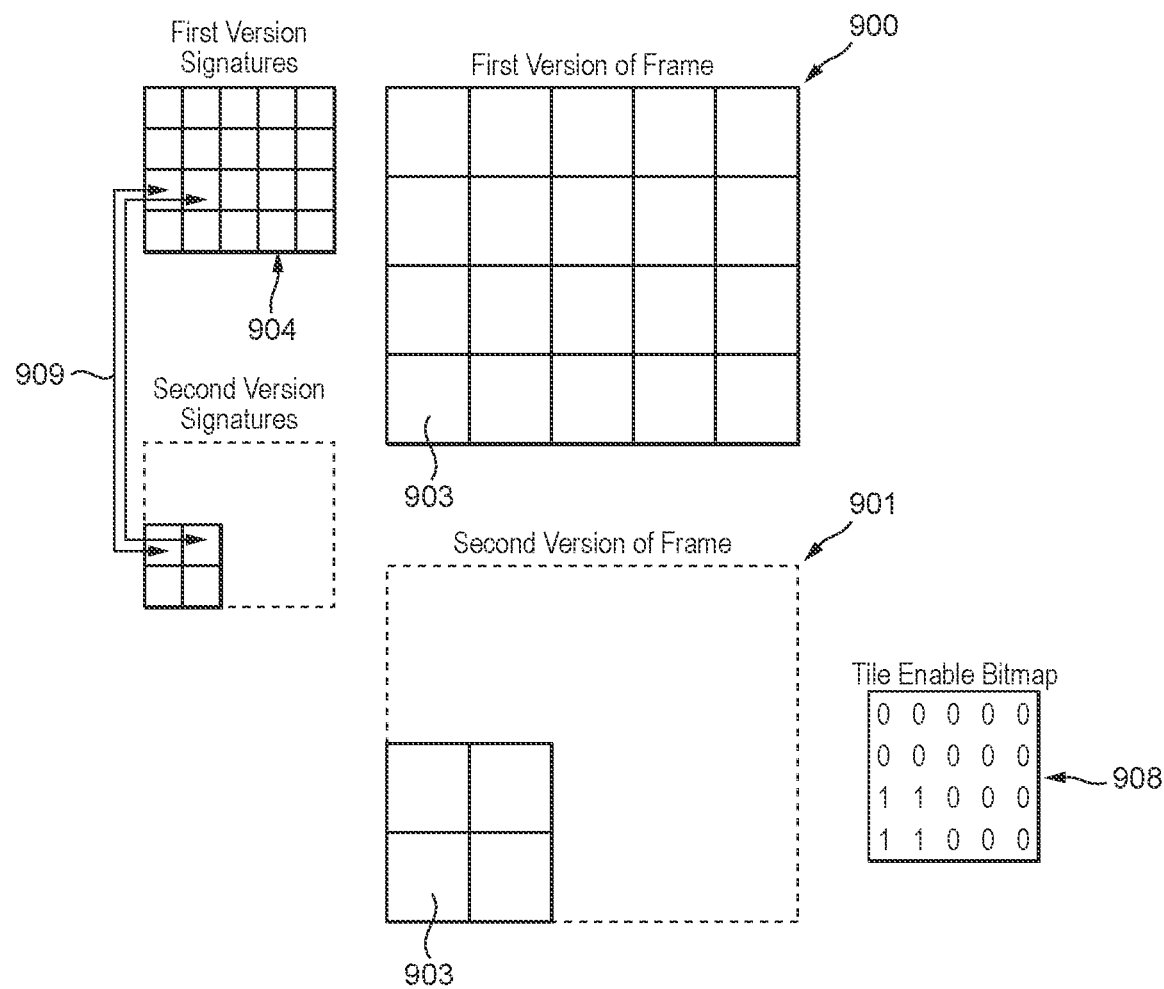
FIG. 9 illustrates the generation of two versions of a frame in the embodiment of FIG. 8.

FIGS. 8 and 9 show another embodiment of the operation of the graphics system and graphics processor when rendering a texture that is to be used for rendering subsequent frames in a safety-critical context. In this case, the operation is similar to the embodiment shown in FIGS. 3, 4 and 5, but rather than render two entire versions of the frame, the graphics processor operates to render only a portion of the frame when rendering the second version of the frame, and then the system compares the rendered portion of the second version of the frame to the corresponding portion of the first version of the frame.

As shown in FIG. 8, in this embodiment, the process starts with the host processor instructing the graphics processor to render two versions of the frame to be used as a texture when rendering subsequent frames for display (step 800a). However, in this embodiment, and in contrast to the embodiment shown in FIGS. 3, 4 and 5, the host processor instructs the graphics processor, when rendering the second version of the frame, to render only a portion of the frame. This is facilitated by the application running on the host processor supplying to the GPU a tile enable bitmap (step 800b), which specifies the tiles that make up the portion of the frame that should be rendered when the GPU renders the second version of the frame.

In response to this instruction, the graphic processor (similarly to the embodiments described above) renders a first version of the texture frame (step 301) in its entirety, and at the same time generates a set of content-indicating signatures (in this case in the form of CRCs) for that version of the texture frame (i.e. by generating a respective content-indicating signature (in the form of a CRC) for each tile of the first version of the frame) and stores the first version 302 of the texture frame and the corresponding set of content-indicating signatures 304 in the memory 130 (steps 303 and 305).

The graphics processor will then operate to render only a portion of a second version of the texture frame (step 806) (but does not store the rendered portion of the second version of the frame to memory). To determine what portion of the second version of the frame to render, the graphics processor reads the tile enable bitmap that is supplied by the application running on the host processor, which indicates the subset of tiles that make up the portion of the frame to be rendered, and then renders only a portion of the texture frame accordingly.

This is illustrated in FIG. 9, which shows the first version of the texture frame 901 (which has been rendered in its entirety, including rendering each tile 903 which the texture frame has to be divided into), and the second version of the texture frame 902, of which only a portion has been rendered (corresponding to a subset of tiles 903 that is specified by a tile enable map 909 supplied to the GPU). In this example, as can be seen, the portion that has been rendered when rendering the second version of the texture frame corresponds to the four tiles in the bottom-left corner of the texture frame.

When the graphics processor renders the (portion of) the second version of the frame, the graphics processor at the same time generates a set of content-indicating signatures 307 for the second version of the frame, and stores the set of content-indicating signatures in memory (step 308). However, and as shown in FIG. 9, the signatures 905 are generated (and stored) for (only) each tile of the subset of tiles that make up the portion that has been rendered. Thus, in this example, the graphics processor generates signatures for each of the four tiles that correspond to the bottom-left corner of the texture frame.

Once the graphics processor has rendered both versions of the texture frame, and stored the first version 302 of that frame, together with the appropriate two sets 304, 307 of content indicating signatures, in the memory 130, the host processor 102 then reads and compares corresponding content indicating signatures (CRCs) generated for the first and second versions of the texture frame (step 809) and determines, on the basis of the signature comparison, whether the portion of the second version of the texture frame matches the corresponding portion of the first version of the texture frame (step 810).

This is done by comparing the signatures stored for the first and second versions of the frame on a tile-by-tile basis 909 (FIG. 9), i.e., a signature stored for a tile of the (portion of the) second version of the frame is compared to the signature of the corresponding tile in the first version of the frame. This is then repeated for each tile of the subset of tiles that makes up the portion of the frame that was rendered when rendering the second version of the frame. Thus, in the example shown in FIG. 9, signatures are compared for each of the tiles of the four tiles making up the bottom-left portion of the frame that was rendered when rendering the second version of the frame.

If the signature comparisons indicate that all the signatures being compared match, then in the present embodiment the host processor correspondingly determines that the portion of the second version of the frame matches the corresponding portion of the first version of the frame.

On the other hand, if any one or more of the signatures do not match when compared (i.e. there is at least one tile (region) of the corresponding portions of the first and second versions of the texture frame for which the signatures did not match), then the host processor determines that portion of the second version of the frame does not match the corresponding portion of the first version of the frame.

When it is determined from the signature comparisons that the corresponding portions of the first and second rendered versions of the texture frame matched, then the host processor 102 determines that the rendered texture frame 302 stored in the memory can be used as a texture for rendering subsequent frames for display, and so will correspondingly instruct the graphics processor to render a further frame using that texture frame (step 311), with the graphics processor 101 then correspondingly rendering the subsequent frame using the texture 302 (step 312), and storing the rendered subsequent frame in the memory (step 313), from where it can then be read for display (step 314).

On the other hand, when it is determined from the signature comparisons that the corresponding portion of the first and second versions of the texture frame did not match, then the host processor 102 performs an appropriate error operation (step 315), as described above.

Although the embodiments have been described above primarily with reference to the avoiding of (transient) faults when rendering a frame that will be used as a texture when rendering subsequent frames, the techniques of the present embodiments may equally be used to (try to) avoid (transient) faults when rendering frames more generally, i.e. to perform "transient" safe rendering in general, e.g. where a graphics processing system and hardware is not otherwise guaranteed to be free or safe from transient faults when operating.

For example, the techniques of the present embodiments could equally be used when the graphics processing system is being used to render a frame that is to form all or part of a safety-critical display itself, such as showing a sensor output, that will simply be displayed (and without being used as an input for a subsequent frame).

In this case, the graphics processor will again generate two versions of the frame, e.g. that is to be displayed, together with respective sets of content-indicating information (signatures) for the two versions of the frame, and then compare the content-indicating information for the two versions of the frame to determine whether the two versions of the frame match (and so the frame is safe to use) or not.

Figure 10:
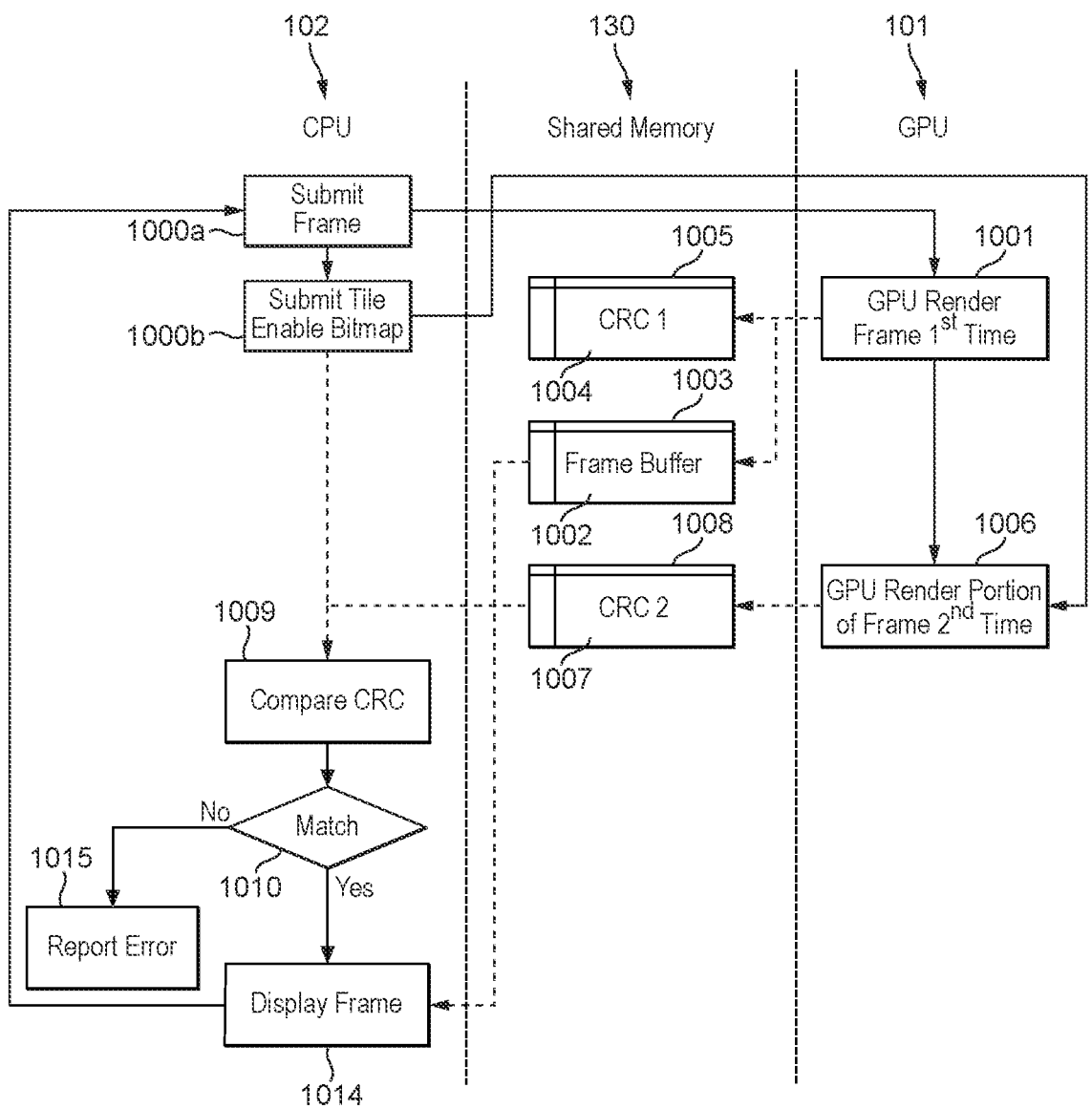
FIG. 10 shows in in more detail the operation of a graphics processing system in an embodiment of the technology described herein.

FIG. 10 shows one such embodiment of the operation of the graphics processing system and graphics processor when rendering a frame that is to be displayed. In this embodiment, the graphics processor operates to render only a portion of the frame when rendering the second version of the frame and the system compares the rendered second portion of the second version of the frame to the corresponding portion of the first version of the frame (similarly to the embodiments shown in FIGS. 8 and 9). However, in this embodiment, the first version of the frame that is rendered is not used to render subsequent frames (in the event that the rendered portion of the second version of the frame matches the corresponding portion of the first version of the frame), but is instead displayed on a display.

The process starts with the host processor instructing the graphics processor to render two versions of the frame to be displayed (step 1000a). The host processor instructs the graphics processor, when rendering the second version of the frame, to render only a portion of the frame. This is facilitated by the application running on the host processor supplying to the GPU a tile enable bitmap (step 1000b).

In response to this instruction, the graphic processor renders a first version of the frame (step 1001) in its entirety, and at the same time generates a set of content-indicating signatures (in this case in the form of CRCs) for that version of the frame, and stores the first version 1002 of the frame and the corresponding set of content-indicating signatures 1004 in the memory 130 (steps 1003 and 1005).

The graphics processor will then operate to render only a portion of a second version of the texture frame (step 1006) (but does not store the rendered portion of the second version of the frame to memory). Similarly to the embodiment shown in FIGS. 8 and 9, the graphics processor reads the tile enable bitmap that is supplied by the application running on the host processor, which indicates the subset of tiles that make up the portion of the frame to be rendered, and then renders only a portion of the texture frame accordingly (as described above in relation to FIG. 9).

Similarly to the embodiment show in FIGS. 8 and 9, when the graphics processor renders the (portion of) the second version of the frame, the graphics processor at the same time generates a set of content-indicating signatures 1007 for the second version of the frame (with signatures generated (and stored) for (only) each tile of the subset of tiles that make up the portion that has been rendered), and stores the set of content-indicating signatures in memory (step 1008).

Once the graphics processor has rendered both versions of the frame, the host processor 102 then reads and compares corresponding content-indicating signatures (CRCs) generated for the first and second versions of the texture frame (step 1009) and determines, on the basis of the signature comparison, whether the portion of the second version of the texture frame matches the corresponding portion of the first version of the texture frame (step 1010). This is done by comparing the signatures stored for the first and second versions of the frame on a tile-by-tile basis (as described above in relation to FIG. 9).

When it is determined from the signature comparisons that the corresponding portions of the first and second rendered versions of the texture frame matched, then the host processor 102 determines that the rendered texture frame 302 stored in the memory can be displayed, and so will correspondingly instruct the graphics processor to output the first version of the frame to a display (step 1014). The system will then proceed to render the next frame that is to be displayed (return to step 1000a), and the process will begin again.

On the other hand, when it is determined from the signature comparisons that the corresponding portion of the first and second versions of the texture frame did not match, then the host processor 102 performs an appropriate error operation (step 1015), as described above.

It should be understood that, although in the embodiments described above (shown in FIGS. 8, 9 and 10) wherein the graphics processor operates to render only a portion of the second version of the frame, the comparison and match determination is performed by the host processor (similarly to the embodiment shown in FIGS. 3, 4 and 5), it would of course instead be possible for the comparison and match determination to be performed by the graphics processor as it generates the tiles for the second version of the texture (similarly to the embodiment shown in FIGS. 6 and 7).

It should also be understood that, although in these embodiments described above (shown in FIGS. 8, 9 and 10), wherein the graphics processor operates to render only a portion of the second version of the frame, the corresponding portions of the first and second versions of the frame are compared on a tile-by-tile basis, with content-indicating signatures for respective tiles of the corresponding portions of the first and second versions of the frame being compared, it would instead be possible for the corresponding portions of the first and second versions of the frame to be compared on a data position-by-data position basis, (e.g. with data positions (and associated set of data values) of the rendered portion of the second version of the frame being compared to corresponding data positions (and associated set of data values) of the corresponding rendered portion of the first version of the frame. The data position-by-data position comparison could be performed by the host processor, or the host processor, or by the application that requires the graphics processing.

It can be seen from the above that the technology described herein, in its embodiments at least, can be used to reduce or avoid the problem of transient faults causing errors when generating frames that will be used for rendering subsequent frames, such as a render-to-texture operation, for example, in safety-critical applications.

This is achieved, in the embodiments of the technology described herein at least, by rendering two versions of the frame that is to be used for rendering further frames, and comparing content-indicating information for the two versions of that frame to determine whether the two versions of the frame match or not.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processing system that includes a graphics processor operable to render frames, the method comprising:
the graphics processor, when rendering a frame, rendering the frame twice, the rendering the frame twice comprising:
rendering a first version of a frame; and
rendering a second version of the frame;
wherein the graphics processor renders the first version of the frame in its entirety, but only renders a portion but not all of the second version of the frame; and
the method further comprising:
comparing the rendered portion of the second version of the frame to a corresponding rendered portion of the first version of the frame; and
determining whether the rendered portion of the second version of the frame matches the corresponding portion of the first version of the frame based on the results of the comparison.

2. The method of claim 1, further comprising the graphics processor:
when rendering the first version of the frame, generating a set of information representative of the content of the portion of the first version of the frame; and
when rendering the portion of the second version of the frame, generating a set of information representative of the content of the portion of the second version of the frame;
and wherein the comparison process comprises comparing the set of information representative of the content of the portion of the second version of the frame to the set of information representative of the content of the corresponding portion of the first version of the frame.

3. The method of claim 2, wherein the information representative of the content of the portion of the version of the frame is in the form of one or more content-indicating signatures for the portion of the version of the frame, which signature(s) are generated from content of the portion of the version of the frame.

4. The method of claim 1, wherein the comparison process comprises comparing a data value for a data position of the portion of the second version of the frame to a corresponding data value for a corresponding data position of the portion of the first version of the frame.

5. The method of claim 1, comprising the graphics processor:
rendering a first version of the frame in its entirety by rendering each and every region of a set of regions that the frame is divided into; and
rendering only a portion of the second version of the frame by rendering only a subset of the set of regions that the frame is divided into;
and wherein the comparison process comprises comparing a region of the second version of the frame to a corresponding region of the first version of the frame.

6. The method of claim 5, further comprising the graphics processor:
when rendering the first version of the frame, generating for at least each region of the subset of the set of regions that the frame is divided into a corresponding set of information representative of the content of that region of the first version of the frame; and
when rendering the portion of the second version of the frame, generating for each region of the subset of the set of regions that the frame is divided into a corresponding set of information representative of the content of that region of the second version of the frame;
and wherein the comparison process comprises comparing the set of information representative of the content of a region of the second version of the frame to the set of information representative of the content of the corresponding region of the first frame.

7. The method of claim 1, wherein the portion of the second version of frame that is rendered by the graphics processor is indicated to the graphics processor by an application that requires the graphics processing.

8. The method of claim 1, wherein the frame that is being rendered comprises a frame that is to be displayed, and the method comprises, when it is determined that the portion of the second version of the frame matches the corresponding portion of the first version of the frame, the graphics processor outputting the first version of the frame to a display.

9. The method of claim 1, comprising:
when it is determined that the first and second versions of the frame do not match, performing an error operation.

10. The method of claim 1, further comprising the graphics processor:
storing to memory the first version of the frame; and
not storing to memory for subsequent use the second version of the frame.

11. A graphics processing system, the graphics processing system comprising:
a graphics processor, the graphics processor comprising a rendering circuit operable to render frames; and
a host processor operable to control the graphics processor to render frames;
the host processor comprising a processing circuit configured to cause the graphics processor to, when a frame is to be rendered, render the frame twice, including to:
render a first version of a frame in its entirety;
render only a portion but not all of a second version of the frame;
the graphics processing system further comprising:
a comparison circuit configured to:

compare a rendered portion of a second version of a frame to a corresponding portion of a rendered first version of the frame; and determine whether the rendered portion of the second version of the frame matches a corresponding portion of the first version of the frame based on the results of the comparison.

12. The system of claim 11, wherein the graphics processor is configured to:

when rendering the first version of the frame, generate a set of information representative of the content of the portion of the first version of the frame; and when rendering the portion of the second version of the frame, generate a set of information representative of the content of the portion of the second version of the frame;

and wherein the comparison circuit is configured to compare the set of information representative of the content of the portion of the second version of the frame to the set of information representative of the content of the corresponding portion of the first version of the frame.

13. The system of claim 12, wherein the information representative of the content of the portion of the version of the frame is in the form of one or more content-indicating signatures for the portion of the version of the frame, which signature(s) are generated from content of the portion of the version of the frame.

14. The system of claim 11, wherein the comparison circuit is configured to compare a data value for a data position of the portion of the second version of the frame to a corresponding data value for a corresponding data position of the portion of the first version of the frame.

15. The system of claim 11, wherein the graphics processor is configured to:

render a first version of the frame in its entirety by rendering each and every region of a set of regions that the frame is divided into; and render only a portion of the second version of the frame by rendering only a subset of the set of regions that the frame is divided into;

and wherein the comparison circuit is configured to compare a region of the second version of the frame to a corresponding region of the first version of the frame.

16. The system of claim 15, wherein the graphics processor is further configured to:

when rendering the first version of the frame, generate for at least each region of the subset of the set of regions that the frame is divided into a corresponding set of information representative of the content of that region of the first version of the frame; and when rendering the portion of the second version of the frame, generate for each region of the subset of the set of regions that the frame is divided into a corresponding set of information representative of the content of that region of the second version of the frame;

and wherein the comparison circuit is configured to compare the set of information representative of the content of a region of the second version of the frame to the set of information representative of the content of the corresponding region of the first frame.

17. The system of claim 11, wherein the graphics processor is configured to render a portion of the second version of frame that is indicated to the graphics processor by an application that requires the graphics processing.

18. The system of claim 11, wherein the frame that is being rendered comprises a frame that is to be displayed, and the graphics processor is further configured to, when it is determined that the portion of the second version of the frame matches the corresponding portion of the first version of the frame, output the first version of the frame to a display.

19. The system of claim 11, further comprising a processing circuit configured to, when it is determined that the rendered portion of the second version of the frame does not match the corresponding portion of the first version of the frame, cause an error operation to be performed.

20. A non-transitory computer readable storage medium storing computer software code which when executing on a graphics processor performs a method of operating a graphics processing system that includes a graphics processor operable to render frames, the method comprising:

the graphics processor, when rendering a frame, rendering the frame twice, the rendering the frame twice comprising:

rendering a first version of a frame; and rendering a second version of the frame;

wherein the graphics processor renders the first version of the frame in its entirety, but only renders a portion but not all of the second version of the frame; and the method further comprising:

comparing the rendered portion of the second version of the frame to a corresponding rendered portion of the first version of the frame; and determining whether the rendered portion of the second version of the frame matches the corresponding portion of the first version of the frame based on the results of the comparison.

* * * * *